US012014706B1

(12) United States Patent
Shapiro

(10) Patent No.: US 12,014,706 B1
(45) Date of Patent: Jun. 18, 2024

(54) HAND BOARD MUSICAL INSTRUMENT

(71) Applicant: Chord Board, LLC, Old Bethpage, NY (US)

(72) Inventor: Akiva Shapiro, Old Bethpage, NY (US)

(73) Assignee: CHORD BOARD, LLC, Old Bethpage, NY (US)

(*) Notice: Subject to any disclaimer, the term of this patent is extended or adjusted under 35 U.S.C. 154(b) by 0 days.

(21) Appl. No.: 18/208,095

(22) Filed: Jun. 9, 2023

Related U.S. Application Data

(62) Division of application No. 18/078,009, filed on Dec. 8, 2022, now Pat. No. 11,842,709.

(51) Int. Cl.
*G10H 1/00* (2006.01)
*G10H 1/38* (2006.01)

(52) U.S. Cl.
CPC ......... *G10H 1/0016* (2013.01); *G10H 1/0066* (2013.01); *G10H 1/38* (2013.01)

(58) Field of Classification Search
CPC ........ G10H 1/38; G10H 1/0025; G10H 1/383; G10H 2210/576; G10H 2210/111; G10H 2210/081; G10H 2210/616; G10H 2240/131; G10H 1/386; G10H 1/34; G10H 2210/115; G10H 2210/145; G10H 2210/601; G10H 2210/335; G10H 2210/596; G10H 2210/626; G10H 2210/581; G10H 2210/571; G10H 2210/611; G10H 2210/621; G10H 2210/591; G10H 2240/145; G10H 2210/586; G10H 2220/036; G10H 2210/606; G10H 2210/421; G10H 2210/435; G10H 2210/451; G10H 2210/465
See application file for complete search history.

(56) References Cited

U.S. PATENT DOCUMENTS 5,440,071 A 8/1995 Johnson
5,841,053 A 11/1998 Johnson et al.
6,448,486 B1 9/2002 Shinsky
6,670,535 B2 12/2003 Anderson et al.
8,987,573 B1 3/2015 Lippens
10,269,335 B1 4/2019 O'Hair et al.
(Continued)

FOREIGN PATENT DOCUMENTS

DE 102014014856 A1 4/2016
GB 2577087 A * 3/2020 ......... G06F 3/04817
(Continued)

OTHER PUBLICATIONS

International Search Report in International Application No. PCT/US22/052312, dated Mar. 28, 2023.
(Continued)

*Primary Examiner* — Marlon T Fletcher
(74) *Attorney, Agent, or Firm* — Greenblum & Bernstein, P.L.C.

(57) ABSTRACT

A musical instrument including a note player operable to produce individual notes in a selected key, wherein a layout of the note player corresponds to a selected chord, in which three finger regions of the note player correspond to a root note, a third note, and a fifth note of the selected chord in the selected key.

23 Claims, 22 Drawing Sheets

(56) References Cited

U.S. PATENT DOCUMENTS

| | | | | |
|---|---|---|---|---|
| 10,818,279 | B1 * | 10/2020 | Swanson | G10H 1/386 |
| 2001/0052283 | A1 | 12/2001 | Boyer | |
| 2003/0209130 | A1 * | 11/2003 | Anderson | G10H 1/386<br>84/443 |
| 2004/0060422 | A1 | 4/2004 | Anderson et al. | |
| 2006/0027080 | A1 * | 2/2006 | Schultz | H04M 19/04<br>84/613 |
| 2007/0089590 | A1 | 4/2007 | Katou | |
| 2007/0214937 | A1 | 9/2007 | Stewart | |
| 2010/0294112 | A1 | 11/2010 | Asakura et al. | |
| 2012/0031254 | A1 | 2/2012 | Hotrique | |
| 2012/0174735 | A1 | 7/2012 | Little et al. | |
| 2014/0083280 | A1 | 3/2014 | Little et al. | |
| 2017/0330539 | A1 * | 11/2017 | Little | G10H 1/0066 |
| 2021/0407477 | A1 * | 12/2021 | Williams | G10H 1/368 |
| 2022/0122572 | A1 * | 4/2022 | Beasley | G10H 1/0008 |

FOREIGN PATENT DOCUMENTS

| | | | | |
|---|---|---|---|---|
| JP | 2009003004 | A | 1/2009 | |
| JP | 2021-522554 | A | 8/2021 | |
| WO | WO-2007096152 | A1 * | 8/2007 | G09B 15/023 |
| WO | WO2008/147356 | A1 | 12/2008 | |
| WO | WO2013/134441 | A2 | 9/2013 | |
| WO | WO-2013134441 | A2 * | 9/2013 | G06F 3/011 |

OTHER PUBLICATIONS

Written Opinion of the International Searching Authority in International Application No. PCT/US22/052312, dated Mar. 28, 2023.

* cited by examiner

340

| Code | Description |
|---|---|
| Note | Note |
| sus | suspended 3 override |
| 2 | sus2 |
| m | minor |
| M | Major |
| 4 | sus4 |
| 0 | dim |
| b5 | M+b5 |
| #5 | m + #5 |
| + | aug |
| 7 | 7 (dom 7) \| m7 |
| M7 | maj7 \| 7 |
| 9 | m7(add9) |
| M9 | maj7(add9) |
| b9 | add(m2) [no 7] |
| 6 | add(M6) |
| 6/9 | add(M6) add2 |
| 11 | m7(add4) |
| B11 | add(m3) [no 7] |
| ? | Undefined Function (e.g., power chord) |
| Default | Root Inversion |
| 1i | 1st Inversion |
| 2i | 2nd Inversion |
| Ai-Fi | Alternate Inversions A thru F |

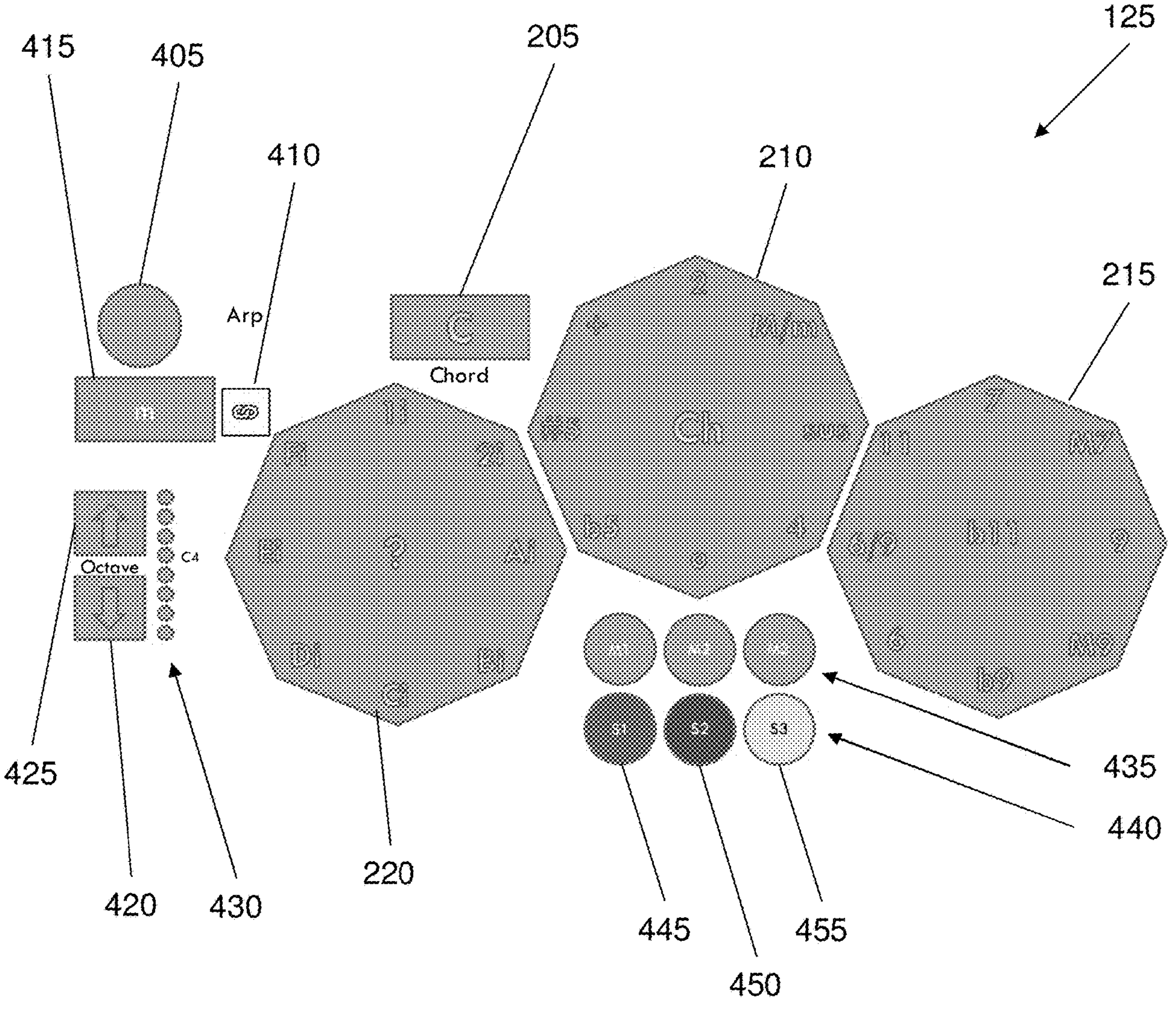

| Code | Description |
|---|---|
| Arp | Per Chord,<br>N Patterns,<br>Join with Other |
| Color guided progression | Green: Next chord<br>Blue:<br>light up in color sequence |
| Color guided intervals from current chord | i.e.,<br>Blue: V of V,<br>Yellow: IV of V<br>Orange: Modulate<br>Red: Parallel<br>White: Related<br>Purple: Leading |
| MPE Polyphonic Aftertouch | Pressure (velocity)<br>Glide (pitch bend vibrato) |
| Memory Buttons | 3 Memory Buttons per Chord |

FIG. 4

Stand-Alone Hand Board

HAND BOARD MUSICAL INSTRUMENT

CROSS REFERENCE TO RELATED APPLICATION

The present application is a divisional application of U.S. patent application Ser. No. 18/078,009, filed Dec. 8, 2022, the content of which is incorporated herein by reference in its entirety.

BACKGROUND OF THE DISCLOSURE

1. Field of the Disclosure

The present disclosure relates to a musical instrument, and more specifically relates to a hand-controlled chord-generating and/or note-generating musical instrument, which may be physically embodied or virtually embodied on a touch screen.

2. Background of the Disclosure

Research has established that studying music enhances academic achievement including areas of mathematics, science, geography, history, foreign language, physical education, and vocational training. Studies have shown that students with piano or keyboard experience performed 34% higher on tests that measure spatial-temporal lobe activity, which is the part of the brain that is used when doing mathematics, science, and engineering.

Studies have shown that music education can be used to enhance cognitive achievement in students. When a student is singing a melody with text, they are using multiple areas of their brain to multitask. Music positively impacts language development, increases IQ, spatial-temporal skills, and improves test scores. For example, music education has also been noted to have the ability to increase someone's overall IQ, especially in children during peak development years. Spatial ability, verbal memory, reading and mathematical ability are seen to be increased alongside music education (primarily through the learning of an instrument). Researchers also note that a correlation between general attendance and IQ increases is evident, and due to students' involvement in music education, general attendance rates increase along with their IQ.

Fine motor skills, social behaviors, and emotional well-being can also be increased through music and music education. The learning of an instrument increases fine motor skills in students with physical disabilities. Emotional well-being can be increased as students find meaning in songs and connect them to their everyday life. Through social interactions of playing in groups like jazz and concert bands, students learn to socialize, and this can be linked to emotional and mental well-being.

Thus, the benefits of incorporating music, and specifically music making, on a person's well-being is well established. While these benefits of music making are clear, there are still many individuals who never learn or attempt to learn how to make music. For example, learning to play a new musical instrument, such as a piano or a guitar, can be intimidating and an imposing task. With a guitar, for example, it can usually take many months of daily practice to progress enough to actually produce musical tones. Additionally, with guitars and pianos, for example, a player must learn different fingerings for the different chords, and achieve the dexterity to move quickly between the different fingerings to achieve the desired chord changes. In other words, with a musical instrument, it usually takes significant time for a user to learn how to play the instrument in order to actually make music.

Due to such impediments, many people never attempt to play a musical instrument. Other people may begin to learn to play a musical instrument, but give up their endeavor before achieving sufficient proficiency with the instrument. As such, many people never experience or maintain the benefits of music making on their well-being.

Thus, there is a need for a musical instrument with an intuitive interface for music creation that does not pose impediments to immediate musical satisfaction.

In addition, there are many accomplished musicians who are skilled in an instrument that doesn't give them access to chords easily, such as wind instruments or drums for example, who don't have the time or opportunity to learn a chord-capable traditional instrument that that can accompany them, or singers who don't play instruments and may rely on other musicians or recorded background tracks to sing along with.

Thus, there is a need for a musical instrument with an intuitive interface for music creation that doesn't require a significant investment in time and energy to learn in order to play sophisticated chord sequences simply and easily, in order to provide new creative avenues for beginner and experienced musicians alike.

SUMMARY OF THE EMBODIMENTS OF THE DISCLOSURE

Aspects of the disclosure are directed to a musical instrument, comprising a chord player section having at least one chord player operable to play a selected chord; the at least one chord player comprising a finger-actuatable first pad having a first center point function and a plurality of first perimeter point functions, wherein the first center point function and the plurality of first perimeter point functions are respectively operable to generate a primary chord having a chord root note or variations of the primary chord having the chord root note.

In embodiments of the disclosure, the at least one chord player additionally comprises: a finger-actuatable second pad having a second center point function and a plurality of second perimeter point functions, wherein the second center point function and the plurality of second perimeter point functions are respectively operable to generate variations of the primary chord having the chord root note, as varied, if at all, by a selection on the first pad.

In further embodiments of the disclosure, the at least one chord player additionally comprises: a finger-actuatable third pad having a third center point function and a plurality of third perimeter point functions, wherein the third center point function and the plurality of the third perimeter point functions are respectively operable to generate variations of the primary chord having the chord root note, as varied, if at all, by the selection on the first pad and, if at all, by a selection on the second pad.

In additional embodiments of the disclosure, each finger-actuatable pad comprises a MIDI polyphonic expression (MPE) controller.

In yet further embodiments of the disclosure, each of the finger-actuatable pads has an octagonal shape and nine selectable functions.

In some embodiments of the disclosure, the chord player section comprises a plurality of chord players of at least seven chord players.

In other embodiments of the disclosure, the chord player section comprises twelve chord players.

In further embodiments of the disclosure, the musical instrument further comprises a chord player layout selector operable to select a layout for the chord players, which is an association between each of the chord players and their respective chord root notes, wherein the layout comprises one of: a key layout; a progression layout; a piano layout; and an alphabetical layout.

In yet further embodiments of the disclosure, each of the plurality of chord players additionally comprises one or more guidance indicators operable to provide user guidance as to a next chord player to actuate.

In some embodiments of the disclosure, the guidance indicators include indicators to indicate an interval from a currently actuated chord player, to indicate at least one of a modulated chord, a parallel chord, a related chord, and a leading chord, and/or to indicate the next chord player to be played in accordance with a selected chord progression.

In additional embodiments of the disclosure, each the at least one chord player additionally comprises an arpeggiator.

In embodiments of the disclosure, each of the at least one chord player comprises a chord root note display operable to display a currently-corresponding chord and chord root note for its respective chord player.

In further embodiments of the disclosure, each of the finger-actuatable pads comprises eight perimeter point functions.

In additional embodiments of the disclosure, the at least one chord player additionally comprises: an octave controller operable to selectively change an octave of the selected chord.

In yet further embodiments of the disclosure, the musical instrument further comprises a key selector operable to select a key root for the musical instrument.

In additional embodiments of the disclosure, the musical instrument further comprises a mode selector operable to select a mode for the musical instrument from amongst: Major (or Ionian), Minor (or Aeolian), Dorian, Phrygian, Lydian, Mixolydian, and Locrian.

In some embodiments of the disclosure, the musical instrument further comprises a progression selector operable to select a chord progression.

In embodiments of the disclosure, the musical instrument further comprises a note player operable to produce individual notes in a selected key, wherein the chord player section is arranged on a first side of the musical instrument, and the note player is arranged on a second side of the musical instrument, wherein a layout of the note player corresponds to a currently playing chord on the chord player, in which three finger regions of the note player respectively correspond to a root note, a third note, and a fifth note of the currently playing chord.

In further embodiments of the disclosure, the note player includes a MIDI polyphonic expression (MPE) controller for each finger.

In yet further embodiments of the disclosure, the note player additionally comprises an arpeggiator.

In yet further embodiments of the disclosure, the musical instrument further comprises a play ahead function in which chord players may be selected sequentially at a speed faster than a selected tempo, while still playing selected chords at the selected tempo or selected when at rest at any speed and then played back at the selected tempo.

In yet additional embodiments of the disclosure, the chord player additionally comprises one or more guidance indicators operable to provide user guidance as to a next chord player to actuate.

Additional aspects of the disclosure are directed to a musical instrument, comprising a note player operable to produce individual notes in a selected key, wherein a layout of the note player corresponds to a selected chord, in which three finger regions of the note player correspond to a root note, a third note, and a fifth note of the selected chord in the selected key.

In further embodiments of the disclosure, the layout of the note player corresponds to the selected chord of the selected key, and in which five finger regions of the note player correspond to five notes of a pentatonic scale corresponding to the selected key.

In yet further embodiments of the disclosure, the three finger regions include index finger, middle finger and ring finger regions of the note player, which respectively correspond to the root note, the third note, and the fifth note of the chord in the selected key.

Implementing aspects of the disclosure provides a musical instrument with an intuitive interface for music creation that does not pose impediments (e.g., extensive knowledge and/or physical dexterity) to immediate musical satisfaction. For example, in contrast to learning to play a piano or a guitar, where it can usually take many months of daily practice to progress enough to actually produce musical tones, and where a player must both learn different fingerings for the different chords and achieve the dexterity to move quickly between the different fingerings to achieve the desired chord changes, with embodiments of the present disclosure, a musical instrument is provided in which neither extensive knowledge of chord fingerings nor dexterity are necessary to achieve immediate musical satisfaction. In other words, with the musical instrument of the present disclosure, it does not take significant time for a user to learn how to play the instrument in order to actually make music. Additionally, implementing aspects of the disclosure provides a musical instrument with an intuitive interface for music creation that doesn't require a significant investment in time and energy to learn in order to play sophisticated chord sequences simply and easily, thus providing new creative avenues for beginner and experienced musicians alike.

As such, by implementing aspects of the disclosure, many more people may more readily access and experience playing music, and thereby experience the resulting benefits of music making on their well-being.

BRIEF DESCRIPTION OF THE DRAWINGS

The novel features which are characteristic of the musical instrument, both as to structure and method of operation thereof, together with further aims and advantages thereof, will be understood from the following description, considered in connection with the accompanying drawings, in which embodiments of the disclosure are illustrated by way of example. It is to be expressly understood, however, that the drawings are for the purpose of illustration and description only, and they are not intended as a definition of the limits of the disclosure. For a more complete understanding of the disclosure, as well as other aims and further features thereof, reference may be had to the following detailed description of the embodiments of the disclosure in conjunction with the following exemplary and non-limiting drawings wherein:

FIG. 4 shows an exemplary view of a chord player section of the chord board in accordance with aspects of the disclosure;

DETAILED DESCRIPTION OF THE EMBODIMENTS OF THE DISCLOSURE

Figure 1:
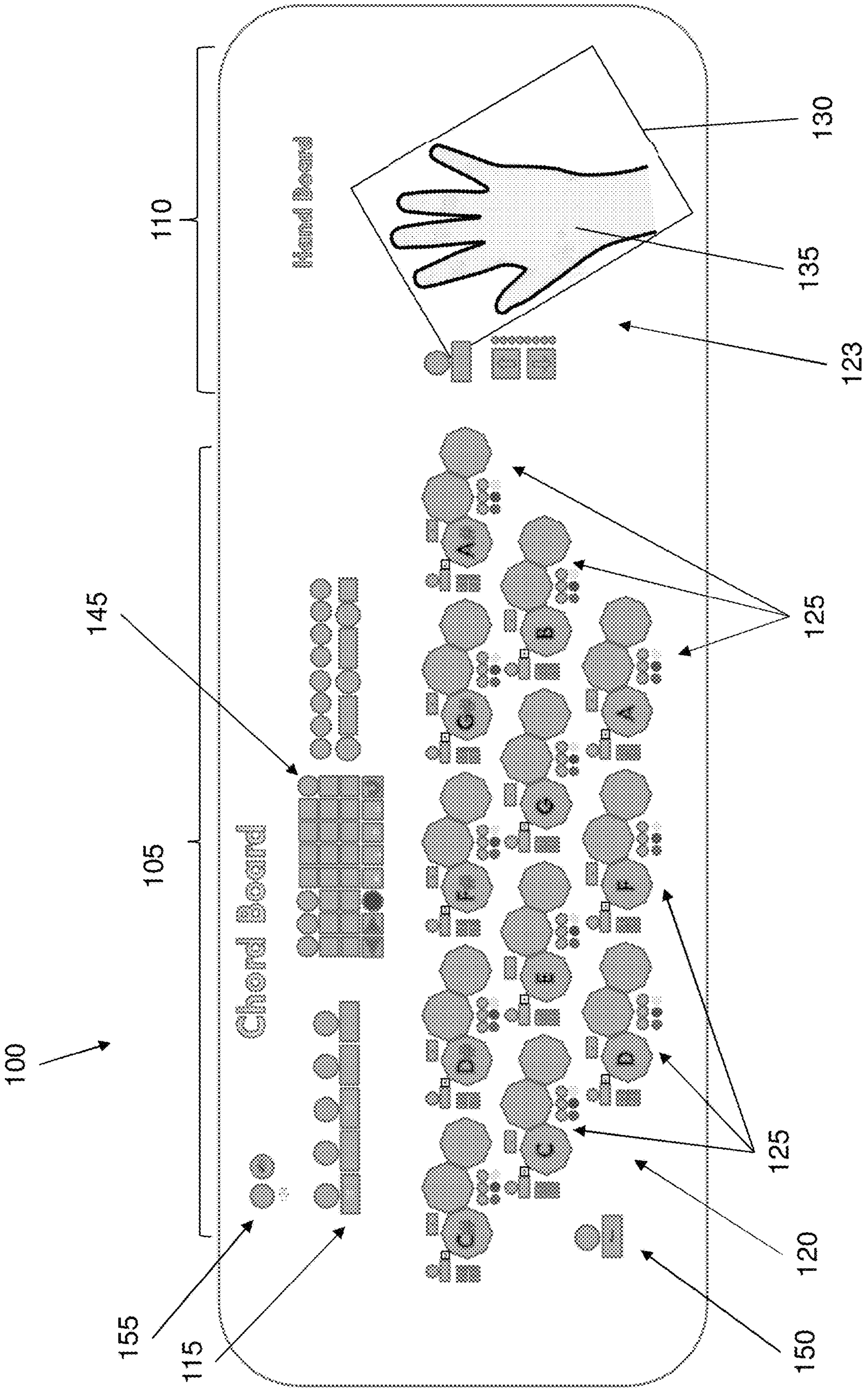
FIG. 1 shows an exemplary depiction of a chord board including a chord section and a note section in accordance with aspects of the disclosure.

The novel features which are characteristic of the disclosure, both as to structure and method of operation thereof, together with further aims and advantages thereof, will be understood from the following description, considered in connection with the accompanying drawings, in which embodiments of the disclosure are illustrated by way of example. It is to be expressly understood, however, that the drawings are for the purpose of illustration and description only, and they are not intended as a definition of the limits of the disclosure.

In the following description, the various embodiments of the present disclosure will be described with respect to the enclosed drawings. As required, detailed embodiments of the present disclosure are discussed herein; however, it is to be understood that the disclosed embodiments are merely exemplary of the embodiments of the disclosure that may be embodied in various and alternative forms. The figures are not necessarily to scale and some features may be exaggerated or minimized to show details of particular components. Therefore, specific structural and functional details disclosed herein are not to be interpreted as limiting, but merely as a representative basis for teaching one skilled in the art to variously employ the present disclosure.

The particulars shown herein are by way of example and for purposes of illustrative discussion of the embodiments of the present disclosure only and are presented in the cause of providing what is believed to be the most useful and readily understood description of the principles and conceptual aspects of the embodiments of the present disclosure. In this regard, no attempt is made to show structural details of the embodiments of the present disclosure in more detail than is necessary for the fundamental understanding of the embodiments of the present disclosure, such that the description, taken with the drawings, making apparent to those skilled in the art how the forms of the embodiments of the present disclosure may be embodied in practice.

As used herein, the singular forms “a,” “an,” and “the” include the plural reference unless the context clearly dictates otherwise. As used herein, the indefinite article “a” indicates one as well as more than one and does not necessarily limit its referent noun to the singular.

Except where otherwise indicated, all numbers expressing quantities used in the specification and claims are to be understood as being modified in all examples by the term “about.” Accordingly, unless indicated to the contrary, the numerical parameters set forth in the specification and claims are approximations that may vary depending upon the desired properties sought to be obtained by embodiments of the present disclosure. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range (unless otherwise explicitly indicated). For example, if a range is from about 1 to about 50, it is deemed to include, for example, 1, 7, 34, 46.1, 23.7, or any other value or range within the range.

As used herein, the terms “about” and “approximately” indicate that the amount or value in question may be the specific value designated or some other value in its neighborhood. Generally, the terms “about” and “approximately” denoting a certain value is intended to denote a range within ±5% of the value. As one example, the phrase “about 100” denotes a range of 100±5, i.e. the range from 95 to 105. Generally, when the terms “about” and “approximately” are used, it can be expected that similar results or effects according to the disclosure can be obtained within a range of ±5% of the indicated value.

As used herein, the term "and/or" indicates that either all or only one of the elements of said group may be present. For example, "A and/or B" shall mean "only A, or only B, or both A and B". In the case of "only A", the term also covers the possibility that B is absent, i.e. "only A, but not B".

The term "substantially parallel" refers to deviating less than 20° from parallel alignment and the term "substantially perpendicular" refers to deviating less than 20° from perpendicular alignment. The term "parallel" refers to deviating less than 5° from mathematically exact parallel alignment. Similarly, "perpendicular" refers to deviating less than 5° from mathematically exact perpendicular alignment.

The term "at least partially" is intended to denote that the following property is fulfilled to a certain extent or completely.

The terms "substantially" and "essentially" are used to denote that the following feature, property or parameter is either completely (entirely) realized or satisfied or to a major degree that does not adversely affect the intended result.

The term "comprising" as used herein is intended to be non-exclusive and open-ended. Thus, for example a composition comprising a compound A may include other compounds besides A. However, the term "comprising" also covers the more restrictive meanings of "consisting essentially of" and "consisting of", so that for example "a composition comprising a compound A" may also (essentially) consist of the compound A.

The various embodiments disclosed herein can be used separately and in various combinations unless specifically stated to the contrary.

A chord, in music, is any harmonic set of pitches/frequencies comprising multiple notes (also called "pitches") that are heard as if sounding simultaneously. For many practical and theoretical purposes, arpeggios and broken chords (in which the notes of the chord are sounded one after the other, rather than simultaneously), or sequences of chord tones, may also be considered as chords in the right musical context.

In tonal Western classical music (music with a tonic key or "home key"), the most frequently encountered chords are triads, so called because they consist of three distinct notes: the root note, and intervals of a third and a fifth above the root note. Chords with more than three notes include added tone chords, extended chords and tone clusters, which are used in contemporary classical music, jazz and almost any other music genre.

The chromatic scale (or twelve-tone scale) is a set of twelve pitches used in tonal music, with notes separated by the interval of a semitone. The chromatic scale is a musical scale with twelve pitches, each a semitone, also known as a half-step, above or below its adjacent pitches. As a result, in 12-tone equal temperament (the most common tuning in Western music), the chromatic scale covers all 12 of the available pitches, namely:

*A-A#/Bb-B-C-C#/Db-D-D#/Eb-E-F-F#/Gb-G-G#/Ab*

Thus, there is only one chromatic scale. As a result, the notes of an equal-tempered chromatic scale are equally-spaced.

Almost all western musical instruments, such as the piano and most fretted instruments, are made to produce the chromatic scale. (Other instruments capable of continuously variable pitch, such as the trombone and violin (and other fretless instruments), can also produce microtones, or notes between those available on a piano.) Most music uses subsets of the chromatic scale such as diatonic scales. While the chromatic scale is fundamental in western music theory, it is seldom directly used in its entirety in musical compositions or improvisation.

MIDI (/'mɪdi/; Musical Instrument Digital Interface) is a technical standard that describes a communications protocol, digital interface, and electrical connectors that connect a wide variety of electronic musical instruments, computers, and related audio devices for playing, editing, and recording music. The specification originates in the paper Universal Synthesizer Interface published by Dave Smith and Chet Wood of Sequential Circuits at the 1981 Audio Engineering Society conference in New York City. A single MIDI cable can carry up to sixteen channels of MIDI data, each of which can be routed to a separate device. Each interaction with a key, button, knob or slider is converted into a MIDI event, which specifies musical instructions, such as a note's pitch, timing and loudness. One common MIDI application is to play a MIDI keyboard or other controller and use it to trigger a digital sound module (which contains synthesized musical sounds) to generate sounds, which the audience hears produced by an amplifier (e.g., a keyboard amplifier). MIDI data can be transferred via MIDI or USB cable, or recorded to a sequencer or digital audio workstation to be edited or played back.

A MIDI controller is any hardware or software that generates and transmits Musical Instrument Digital Interface (MIDI) data to MIDI-enabled devices, typically to trigger sounds and control parameters of an electronic music performance. They most often use a musical keyboard to send data about the pitch of notes to play, although a MIDI controller may trigger other effects. Such a device provides a musical keyboard and perhaps other actuators (pitch bend and modulation wheels, for example) but produces no sound on its own. It is intended only to drive other MIDI devices. Electronic musical instruments, including synthesizers, samplers, drum machines, and electronic drums, are used to perform music in real time and are able to transmit a MIDI data stream of the performance. Some are keyboard-only controllers, though many include other real-time controllers such as sliders, knobs, and wheels. Commonly, there are also connections for sustain and expression pedals.

A MIDI keyboard or controller keyboard is typically a piano-style electronic musical keyboard, often with other buttons, wheels and sliders, used for sending MIDI signals or commands over a USB or MIDI 5-pin cable to other musical devices or computers. MIDI keyboards lacking an onboard sound module cannot produce sounds themselves, however some models of MIDI keyboards contain both a MIDI controller and sound module, allowing them to operate independently. When used as a MIDI controller, MIDI information on keys or buttons the performer has pressed is sent to a receiving device capable of creating sound through modeling synthesis, sample playback, or an analog hardware instrument. The receiving device could be:

- a computer running a digital audio workstation (DAW) or a standalone VST/AU software instrument (the receiving device can also be used to re-route the MIDI signal to other devices);
- a sound module; or
- a digital or analog hardware instrument with MIDI capability, such as a synthesizer or electronic piano or drum machine.

A typical signal path for a MIDI controller may include, for example:

MIDI controller→5-pin MIDI connector or USB cable→computer running a DAW or a standalone VST/AU software instrument or a sound module or an electronic piano, stage piano, or synthesizer with MIDI capability→audio sound device (amplifier and speakers or headphones).

Control surfaces are hardware devices that provide a variety of controls that transmit real-time controller messages transmitted over MIDI or a proprietary format. These enable software instruments to be programmed without the discomfort of excessive mouse movements, or adjustment of hardware devices without the need to step through layered menus, for example. Buttons, sliders, and knobs are the most common controllers provided, but rotary encoders, transport controls, joysticks, ribbon controllers, vector touchpads, and optical controllers may also be utilized. Controllers may be general-purpose devices that are designed to work with a variety of equipment, or they may be designed to work with a specific piece of software.

Sequencers store and retrieve MIDI data and send the data to MIDI-enabled instruments in order to reproduce a performance.

Software synthesizers offer great power and versatility, but some players feel that division of attention between a MIDI keyboard and a computer keyboard and mouse robs some of the immediacy from the playing experience. In contrast, devices dedicated to real-time MIDI control provide an ergonomic benefit and can provide a greater sense of connection with the instrument than can an interface that is accessed through a mouse and computer keyboard.

FIG. 1 shows an exemplary depiction of a "chord board" 100 music controller, which is a musical instrument. The chord board 100 includes a chord side 105 and a note side 110 (or "hand board") in accordance with aspects of the disclosure. With embodiments of the present disclosure, the chord board 100 is a MIDI controller or may contain a built-in sound module or synthesizer. As shown in FIG. 1, the chord side 105 is arranged on the left-hand side of the chord board 100 so as to be played with a user's left hand (not shown) and the note side 110 is arranged on the right-hand side of the chord board 100 so as to be played with a user's right hand 135. (The disclosure contemplates an opposite configuration, in which the chord side 105 is arranged on the right-hand side of the chord board so as to be played with a user's right hand and the note side 110 is arranged on the left-hand side of the chord board so as to be played with a user's left hand, in which case the layout of the note side will be for the left hand).

In accordance with aspects of the disclosure, the chord side 105 includes a chord player section 120, which is operable to produce chords by a user depressing one or more pads with their left hand, and the note side 110 includes a note player 123, which is operable to produce one or more individual notes by a user manipulating one or more fingers of their right hand 135 on a sensor pad 130. In such a manner, in accordance with aspects of the disclosure, a user of the chord board 100 may play a musical composition in which they accompany themselves (e.g., playing chords with one hand and a lead line or melody with their other hand) in a manner similar to a pianist.

As shown in FIG. 1, in certain embodiments of the disclosure, the chord player section 120 includes twelve individual chord players 125, with each chord player 125 corresponding to one of the twelve tones (A-A #/Bb-B-C-C #/Db-D-D #/Eb-E-F-F #/Gb-G-G #/Ab). As such, with this exemplary embodiment of the disclosure, the chord player section 120 includes twelve chord players 125. As described below, the association between each of the twelve tones (or root notes) and each of the chord players 125 is configurable in different layouts (e.g., based upon a selected key and/or a desired layout). Thus, in one exemplary layout the left-most, upper-most chord player 125 may be configured to play a C # chord, as shown in FIG. 1, and in another exemplary layout the left-most, upper-most chord player 125 may be configured to play an A # chord (see, e.g., FIG. 14). As shown in FIG. 1, the chord side 105 includes a layout selector 150, which is operable to select a layout of the chord players 125 (i.e., select an association between each of the twelve tones (or chord root notes) and each of the chord players 125.

It should be understood that while each of the chord players 125 shown in the exemplary embodiment of FIG. 1 depicts a chord root note displayed on a pad thereof, these depicted root notes on the pad are shown in FIG. 1 in order to facilitate an understanding of the disclosure, and with this exemplary embodiment, are not actually displayed upon any of the pads. Instead, as described below, each of the chord players 125 includes a dedicated chord root note display, which is operable to display the root note corresponding to its respective chord player 125. Is should also be understood, however, that the disclosure contemplates pads that include a configurable display or other indication (e.g., color illumination), which could be used to indicate the corresponding chord root note instead of a dedicated root note display.

As shown in FIG. 1, the chord board 100 also includes a power and volume (mute) control section 155 (including a power switch and a mute switch), a setup control section 115, and a sequencer control section 145.

While not shown, it should be understood that the chord board 100 has suitable jacks and connections, for example, on a rear side thereof. For example, the chord board 100 may include a headphone jack (e.g., ¼" or 3.5 mm), one or more expression pedal jacks, MIDI in, MIDI Thru, and MIDI out jacks, a power jack (e.g., USB power jack or AC power jack), CV connectors, a line out, and/or an audio out. While the chord board 100 may be connected to AC power with the power jack, the disclosure contemplates that the chord board 100 may be powered with a battery (e.g., DC power) or by USB. As such, the chord board 100 may have a suitable battery compartment for accommodating one or more batteries. Control Voltage (or CV) is a DC electrical signal used to manipulate the values of components in analog circuits. Control voltages are used in numerous ways in many different types of electronic circuits for all sorts of purposes and may be used to control electronic musical equipment.

Figure 2:
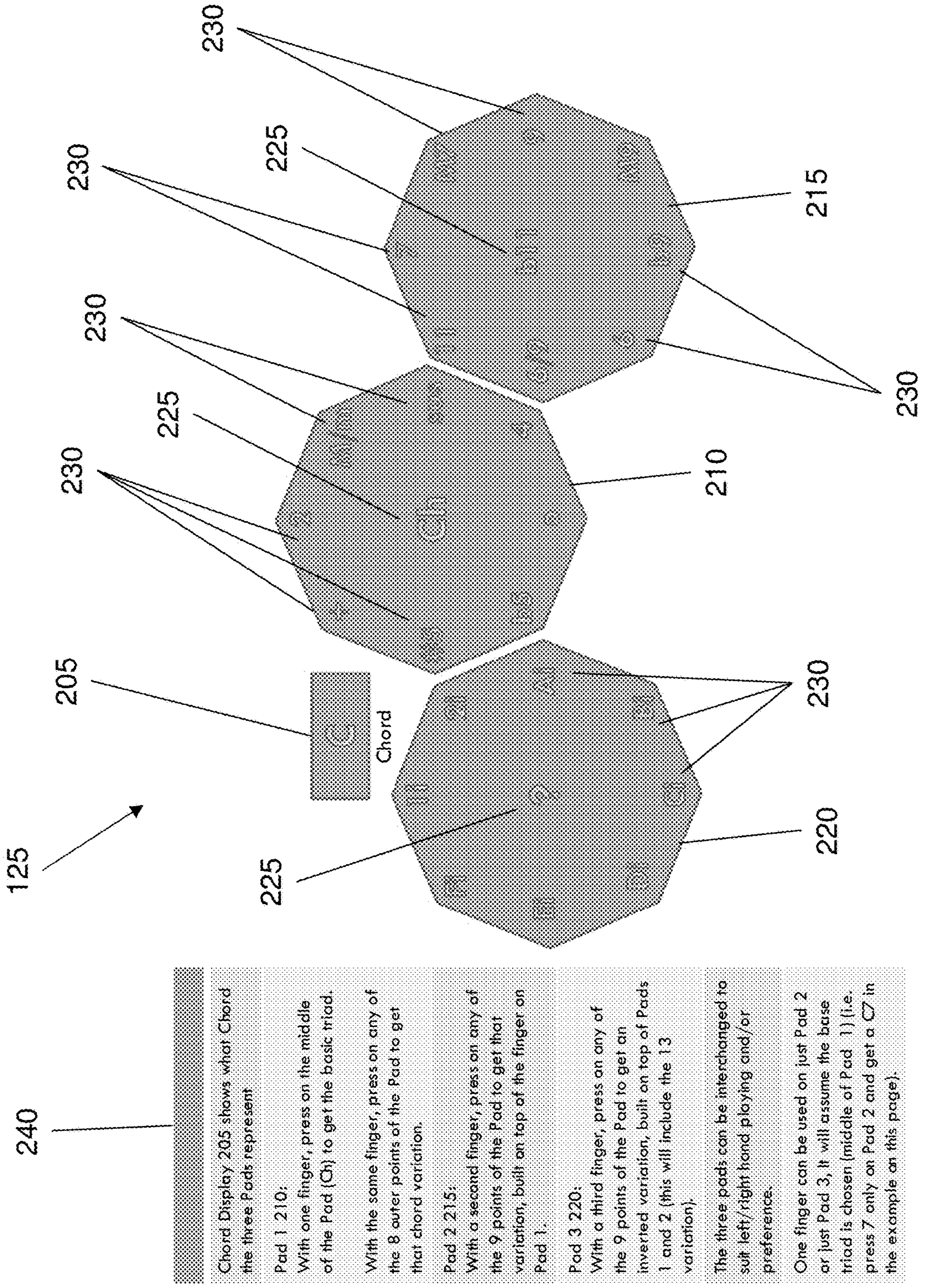
FIG. 2 shows an exemplary view of a chord player of the chord board along with a pad operation guide in accordance with aspects of the disclosure.

FIG. 2 shows an exemplary view of aspects of a chord player 125 of the chord board along with a pad operation guide 240 in accordance with aspects of the disclosure. As shown in FIG. 2, the chord player 125 includes a first pad (or pad 1) 210, a second pad (or pad 2) 215, and a third pad (or pad 3) 220. With the exemplary embodiment, each of the pads 210, 215, 220 has an octagonal shape with a center contact point 225 and eight corner contact points 230. Thus, each of the pads 210, 215, 220 has up to nine selectable functions. The chord player 125 also includes a chord root note display (or chord display) 205, which displays the currently-corresponding chord (and chord root note) for the chord player 125. With the example, of FIG. 2, the chord display 205 for the chord player 125 is "C," which indicates C major chord. (A lowercase "c" would designate C minor chord.) Thus, depressing one or more of the contact points 220, 225 on one or more of the pads 210, 215, 220 of this chord player will produce some variation of a C chord, as explained below.

With an exemplary operation, a user would with one finger press on the middle (i.e., the center contact point 225) of the first pad 210 to produce the basic triad (with a major chord: the root, the $3^{rd}$, and the $5^{th}$; and with a minor chord: the root, the minor (or flat) $3^{rd}$, and the $5^{th}$). For example, as shown in FIG. 2, by depressing the center contact point 225 of the first pad 210 (labeled "Ch"), a chord corresponding to what is displayed in the chord display 205 (with the example, of FIG. 2, a C major chord) is produced. With that same finger, a user may press instead of the center, on any of the eight outer (or corner) points 230 of the first pad 210 to produce any of a plurality of selected chord variations. For example, depressing the "M/m" corner contact point plays either the minor chord or the major chord, whichever the "Ch" contact point does not play. That is, if the chord display 205 indicates a C major chord, the "Ch" contact point will generate a C major chord, and the "M/m" corner contact point generates a C minor chord. In contrast, if the chord board is configured such that the chord display 205 indicates a C minor chord (with a lowercase c), the "Ch" contact point will generate a C minor chord, and the "M/m" corner contact point generates a C major chord. The chord variations selectable by the first pad 210 additionally include: "sus", "4", "o", "b5", "#5", "+", and "2", which are explained below.

With an additional example, if the chord board is configured such that the chord display 205 indicates a B diminished chord (or "B° chord"), the "Ch" contact point will generate the B diminished chord. As a diminished cord is a minor chord with a diminished $5^{th}$, the "o" corner contact point generates a B minor chord (e.g., it acts as the opposite and removes the diminished), and the "M/m" corner contact point generates a B major chord. In contrast, if the chord board is configured such that the chord display 205 indicates a B minor chord (with a lowercase b), the "Ch" contact point will generate a B minor chord, and the "M/m" corner contact point generates a B major chord, and the "o" corner contact point generates a B diminished chord.

As noted above, a chord corresponding to what is displayed in the chord display 205 (with the example, of FIG. 2, a C major chord) is produced by the corresponding chord player. It should be understood that each of the chord players 125 can be configured to produce chords built from any one of the twelve tones. Thus, the chord display 205 may display any one of the twelve tones (A-A #/Bb-B-C-C #/Db-D-D #/Eb-E-F-F #/Gb-G-G #/Ab) in both major (upper case letter) and minor (lower case letter) configurations. As described below, the association between each of the twelve tones (or root notes) and each of the chord players 125 is configurable in different layouts (e.g., based upon a selected key, a selected progression and/or a desired layout).

In accordance with further aspects of the disclosure, the user may next use a second finger to press on any of the nine points of the second pad 215 to produce the selected variation on top of the chord produced by the selection on the first pad 210. With this exemplary embodiment, the selected variations selectable by the second pad 215 include: "b11", "M7", "9", "M9", "b9", "6", "6/9", "11", and "7", which are explained below.

In accordance with aspects of the disclosure, the user may use a third finger to press on any of the nine points of the third pad 220 to produce, in an exemplary embodiment, inversions (or inverted variations) of the chord selected by the first pad 210 and/or the second pad 215 on top of the chord produced by selections on the first pad 210 and/or second pad 215 (or in lieu of the chord produced by selections on the first pad 210 and/or second pad 215). The inversions selectable by the third pad 215 include: "Ai", "Bi", "Ci, "Di", "Ei", "Fi", "1i", "2i", and "?", which are explained below, and which include the thirteenth variation.

Additionally, if a finger is used, for example, only on the second pad 215 or only on the third pad 220, the chord player 125 will function as if the base triad (i.e., the middle contact 225 of the first pad 210 is depressed. For example, with the example of FIG. 2, if only the "7" variation is selected using the second pad 215, the chord board 100 will generate a C7 chord (and not just the major $7^{th}$ note) without depressing the first pad 210. As an additional example, with the example of FIG. 2, if only the "1i" variation is selected using the third pad 220, the chord board 100 will generate a C major chord in its first inversion. As an additional example, with the example of FIG. 2, if the "7" variation is selected using the second pad 215 together with "1i" variation selected using the third pad 220, the chord board 100 will generate a C7 chord in its first inversion.

While the pads are shown in a particular configuration, the disclosure contemplates that the three pads can be interchanged, for example, to suit a left/right hand playing style and/or player preference. Additionally, while each of the pads has an octagonal shape and provides nine selections, the disclosure contemplates polygonal pads having more or less than eight corners (with a corresponding more or less selections) and pads having other non-polygonal shapes (e.g., circular pads) that provide nine selections (or more or less selections).

Additionally, while the disclosure contemplates that a pad can be made of physical material which includes depressions (and/or protrusions), in other contemplated embodiments, each pad is MPE enabled. For example, in some embodiments, each finger-actuatable pad may comprise one or more MIDI polyphonic expression (MPE) controllers. The pad may be any surface comprising a touch point (e.g., a finger-actuatable continuous controller touch point), such as an optical diode for instance, or, as a second example, a continuous touch sensitive circular strip or mini-touch screen display, where a player sliding their finger around could achieve microtones between the enumerated variations. With such contemplated embodiments, for example, with a MPE in a circular array, in addition to providing a center point function and a plurality of circumferential point functions, the MPE may provide a range of functions between the center point function and each circumferential point function. For example, with a contemplated embodiment, if a finger is slid from the center point function to a circumferential point function on the MPE controller, the chord may slide between the first chord (determined by the center point function) and the second chord (determined by the selected circumferential point function).

As shown in FIG. 2, each of the pads 210, 215, and 220 include indicators for the respective functions of each of the contact points 220, 225. In some embodiments, the pads may include labels or other fixed markings to indicate the respective functions. In other contemplated embodiments, the pads may include configurable displays (e.g., screens or touchscreens) for each (or all) of the respective functions, which may be used to display a current function (from amongst a plurality of options). In such a manner, in embodiments, the respective functions of each of the contact points of the pads may be user-configurable. In other contemplated embodiments, a user may configure the respective functions of each of the contact points of the pads (e.g., to suit their preferences) and then apply function indicators (e.g., adhesively) to the respective regions of the pads or the functions may be displayed on a screen embedded in the chord board 100. In embodiments, respective functions may be user-configurable and/or user-definable, for example, via an accompanying software (e.g., iOS app or Android app).

Figure 3:
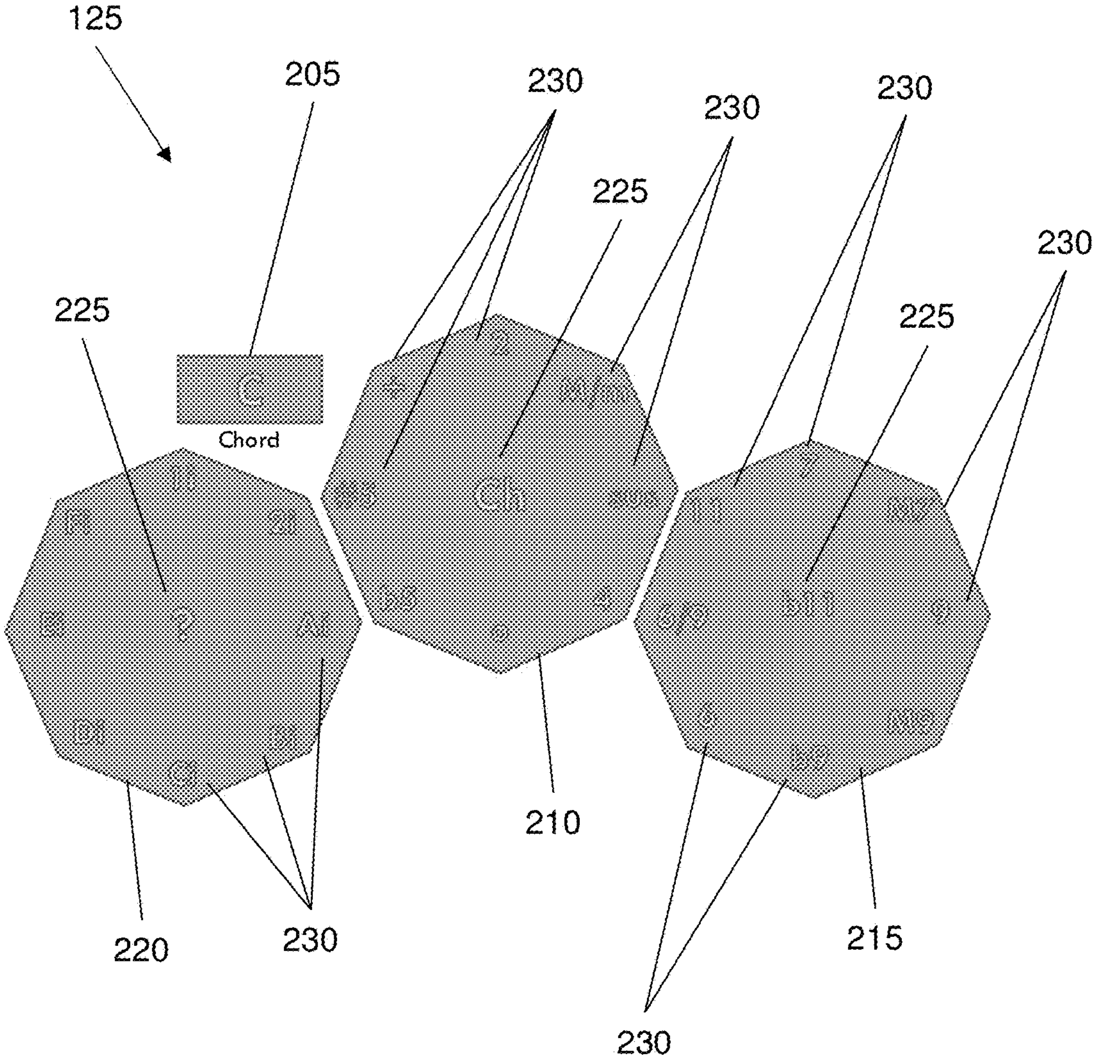
FIG. 3 shows the exemplary view of the chord player of the chord board along with a pad layout guide in accordance with aspects of the disclosure.

FIG. 3 shows the exemplary view of aspects of a chord player 125 of the chord board 100 along with a pad layout guide 340 in accordance with aspects of the disclosure. As introduced above, chords are designated by a letter indicating the root note (e.g., C), which may be followed by a symbol or abbreviation indicating the chord quality (e.g., minor (min), augmented (aug) or diminished (o)). (If no chord quality is specified, the chord is assumed to be by default either major or minor triad corresponding to whether the root note is upper or lower case, respectively.) Additionally, number(s) are used to indicate the stacked intervals above the root note (e.g., 7 or 13). Furthermore, additional musical symbols or abbreviations may be used for special chord alterations (e.g., b5, #5 or add13).

Understanding that a triad consists of three notes referred to as the root note, the third note, and the fifth note, where, in a major triad, the third note is a major third (four semitones above the root note), and in a minor triad, the third note is a minor third (three semitones above the root note), and in both major and minor chords the fifth note is a perfect fifth (or seven semitones above the root note), the symbols used for producing chords in this disclosure include:

Pad 1:

Ch will produce the default chord, whether major or minor, or diminished.

2 will produce a sus2 chord. It substitutes the third note in a triad for a major second note (two semitones above the root note).

M/m will produce a major chord if the default is a minor chord, or a minor chord if the default is a major chord or the default is a diminished chord. It substitutes the major third and minor third for each other. The "m" is lowercase for a minor chord and uppercase "M" for a major chord.

Sus will produce a two-note chord consisting of the root note and perfect fifth, removing the third note. This is colloquially called a "power chord".

4 will produce a sus4 chord. It substitutes the third note in a triad for a perfect fourth note (five semitones above the root note).

O will produce a diminished chord, or a minor chord if the default chord is a diminished chord.

indicates a power chord, which removes the third note in a triad with no substitution.

b5 will produce a major chord but substitute the perfect fifth note for a flatted fifth note (six semitones above the root note).

#5 will produce a major chord but substitute the perfect fifth note for a sharpened fifth note (eight semitones above the root note).

+ will produce an augmented chord.

Pad 2:

7 will produce the following: 1) for a major chord, it will produce a dominant seventh chord which is major triad (or as modified by pad 1), adding a note a minor seventh (10 semitones) above the root; 2) for a minor chord (or as modified by pad 1), it will produce a minor seventh chord, which is minor triad, adding a note a minor seventh (10 semitones) above the root; 3) for a diminished chord it will produce a diminished seventh chord, which is a diminished triad, adding a note a diminished seventh (9 semitones) above the root.

M7 will produce the following: 1) for a major chord (or as modified by pad 1), it will produce a major seventh chord, which is a major triad, but this time adding a note a major seventh (11 semitones) above the root; 2) for a minor chord (or as modified by pad 1), it will produce a minor/major seventh chord, which is a minor chord, adding a note a major seventh (11 semitones) above the root; 3) for a diminished chord, it will produce a half-diminished seventh chord, which is a diminished triad, adding a note a minor seventh (10 semitones) above the root.

9 will produce a dominant ninth chord, which is a base triad (or as modified by pad 1) with an added minor seventh note and an added ninth note, which is one octave and two semitones above the root note.

M9 will produce a major ninth chord, which is a base triad (or as modified by pad 1) with an added major seventh note and an added ninth note, which is one octave and two semitones above the root note.

b9 will produce a flat ninth chord, which is a base triad (or as modified by pad 1) with an added minor seventh note and an added flatted ninth note, which is one octave and one semitone above the root note.

6 will produce a sixth chord, which is a base triad (or as modified by pad 1) with an added sixth note, which is nine semitones above the root.

6/9 will produce a sixth chord with an added ninth note, which is one octave and two semitones above the root note.

11 will produce as follows: 1) for a major chord, it will produce an eleventh chord, which is a dominant seventh chord with an added eleventh note, which is one octave and four semitones above the root note; 2) for a minor chord, it will produce a minor eleventh chord, which is a minor seventh chord with an added eleventh note, which is one octave and four semitones above the root note.

b11 will produce a minor triad (or as modified by pad 1) with an added flat eleventh note, which is one octave and three semitones above the root (there is no seventh note added).

Pad 3:

1i will produce a base triad (or as modified by pads 1 and/or 2), with the root note raised an octave so the third note of the chord is the lowest note in the triad.

2i will produce a base triad (or as modified by pads 1 and/or 2), with the first and third notes raised an octave, so the fifth note is the lowest note in the triad.

Ai through Fi will produce a base triad (or as modified by pads 1 and/or 2), with various different combinations of the notes in the chord lowered or raised by an octave to create different voicings for the same chord.

? will produce an inverted power chord, which is the root and fifth of a chord, with no third, where the fifth note of the chord is lowered an octave, so it is the lowest note.

This is further explained below.

As shown in FIG. 3, shorthand labels for each of the pad functions is explained by the pad layout guide 340. Thus, for example, depressing the "+" region of the first pad 210 will produce a C augmented chord. Depressing the "b5" region of the first pad 210 and the "7" region of the second pad 215 will produce a C7b5 chord. In such a manner, in accordance with aspects of the disclosure, a wide variety of chordal variations of the selected root chord are instantly accessible to a user via one or two fingers.

Additionally, in accordance with further aspects of the disclosure, the third pad 220 may be used to produce inversions of the currently selected chord (that is the base chord or as selected by depressing one or more of the first pad 210 and the second pad 215). In other contemplated embodiments, the third pad can be configured to produce variations of the currently selected chord, which may include inversions or other chord variations, including user-programmable configurations, for example. A chord's inversion describes the relationship of its lowest notes to the other notes in the chord. For example, a C-major triad contains the tones C (the root or $1^{st}$), E (the $3^{rd}$) and G (the $5^{th}$). The inversion is determined by which of these tones (C, E, or G) is the lowest note (or bass note) in the chord.

A chord is in root position if its root is the lowest note. This is sometimes known as the parent chord of its inversions. For example, the root of a C-major triad is C, so a C-major triad will be in root position if C is the lowest note and its third and fifth (E and G, respectively) are above it. In an inverted chord, the root is not the lowest note. The inversions are numbered in the order their lowest notes appear in a close root-position chord (from bottom to top). A C-major triad (or any chord with three notes) has two inversions.

In the first inversion, the lowest note is E—the third of the triad—with the fifth and the root stacked above it (the root now shifted an octave higher), forming the intervals of a minor third and a minor sixth above the inverted bass of E, respectively. In the second inversion, the lowest note is G—the fifth of the triad—with the root and the third above it (both again shifted an octave higher), forming a fourth and a sixth above the (inverted) bass of G, respectively.

Chords with four notes (such as seventh chords) work in a similar way, except that they have three inversions, instead of just two. Chords with five notes work in a similar way, except that they have four inversions, instead of just three.

As shown in FIG. 3, the selectable inversions include a first inversion "li" of the triad, a second inversion "2i" of the triad, and a number of inversions "Ai"-"Fi" for more complex chords than simple triads. For example, "Ai" may be the third inversion of a four-note (or more) chord, and "Bi" may be the fourth inversion of a five-note chord. In embodiments, the inversions "Ai"-"Fi" may be user-configurable and/or user-definable, for example, via an accompanying software (e.g., iOS app or Android app).

With the example of FIG. 3, depressing the "Ch" region on the first pad 210 will generate a C major chord, which is the parent chord, and includes the notes of C (the root or $1^{st}$), E (the $3^{rd}$) and G (the $5^{th}$) from low to high. In accordance with aspects of the disclosure, depressing the "1i" region of the third pad 220 will generate the first inversion of the C major chord, which includes the notes of E (the $3^{rd}$), G (the $5^{th}$), and C (the root) from low to high. Likewise, depressing the "2i" region of the third pad 220 will generate the second inversion of the C major chord, which includes the notes of G (the $5^{th}$), C (the root), and E (the $3^{rd}$) from low to high. If the third pad 220 is actuated without the first pad 210 being depressed, the chord player 125 will function as if the base triad (i.e., the middle contact 225 of the first pad 210 is depressed) and will play the selected inversion of the base triad In such a manner, in accordance with aspects of the disclosure, a wide variety of inversions of the selected root chord are instantly accessible to a user via a third finger. In contrast, in the context of a guitar, each of a first inversion and a second inversion of a chord requires a completely different fingering on a different position of the guitar neck. Moreover, the inversions for each modified chord (e.g., minor, augmented, diminished, minor $7^{th}$), each also require a completely different fingerings at different positions on the guitar neck; and some inversion or voicings are not physically possible to play on the guitar. The same is true for inversions on a piano. As such, producing inversions on a conventional musical instrument and fluidly moving between different fingering positions of multiple fingers to achieve the inversions can be very difficult to master. By implementing aspects of the present disclosure, however, a user can easily produce a selected inversion with a single finger and quickly change between different inversions with the single finger.

In such a manner, and in accordance with aspects of the disclosure, the utilization of inversions in musical compositions is more readily and easily accessible to all players without the need for achieving the dexterity necessary to form the chord structures and without requiring the knowledge of such chord structures.

FIG. 4 shows an exemplary view of a chord player 125 of the chord board along with a description guide 490 in accordance with aspects of the disclosure. As shown in FIG. 4, the chord player 125 includes the first pad (or pad 1) 210, the second pad (or pad 2) 215, and the third pad (or pad 3) 220. The chord player 125 also includes the chord root note display (or chord display) 205, which displays the currently-corresponding chord (and chord root note) for the chord player 125. In embodiments, each pad may be MPE enabled. For example, in some embodiments, each finger-actuatable pad may comprise one or more MIDI polyphonic expression (MPE) controllers detecting pressure (e.g., to control velocity) and glide (e.g., to control pitch bend and/or vibrato).

As shown in FIG. 4, the chord player 125 also includes an arpeggiator section having a rotary encoder 405 for selecting a particular arpeggiation pattern (e.g., from n patterns), a display 415 for indicating the selected arpeggiation pattern for that chord player 125, and a link button 410 for linking together arpeggiators from other chord players 125 on the chord board 100. An arpeggiator takes input chords and converts them into arpeggios. An arpeggio is a type of broken chord, in which the notes that compose a chord are played in a pattern. An arpeggio may also span more than one octave. The rotary encoder 415 for the arpeggiator allows the player to select different patterns which include variations of speed, range, and mode (the movement of the arpeggio).

In accordance with aspects of the disclosure, the arpeggiator may be configured to apply different arpeggiation patterns to different chords on the chord board 100 (e.g., a first arpeggiation pattern for a C major chord on one chord player 125, and a second arpeggiation pattern for a D minor chord on another chord player 125).

As shown in FIG. 4, the chord player 125 also includes three memory buttons 435 (e.g., m1, m2, m3), for saving played chords and subsequently selecting saved played chords (e.g., a Csus2b9 chord may be saved to M1 and a Csus4M7 chord with inversion 1i may be saved to M2, and the player can then press M1 or M2 to recall those chords rather than forming them again using the pads). This allows for single finger play and quicker transition between chord formations which require more than one finger to play. In embodiments, the memory buttons may be illuminated buttons. In embodiments, the illuminations can indicate if a chord is saved to that memory spot, and indicate the configuration of the chord.

The chord player 125 also includes an octave up button 425 and an octave down button 420 for selecting different octaves for the chord player 125. In music, an octave is the interval between one musical pitch and another with double its frequency. Most musical scales are written so that they begin and end on notes that are an octave apart. For example, the C major scale is typically written C D E F G A B C, the initial and final C's being an octave apart. Octaves are identified with various naming systems. Among the most common are the scientific, Helmholtz, organ pipe, and MIDI note systems. In standard pitch notation, a specific octave is indicated by a numerical subscript number after note name. In this notation, middle C is $C_4$, because of the note's position as the fourth C key on a standard 88-key piano keyboard, while the C an octave higher is $C_5$.

As shown in FIG. 4, by pressing the octave up button 425 or the octave down button 420, a user can quickly change the octave of the chord player 125 (similarly to shifting up or down octaves on a piano keyboard). With the exemplary embodiment, the currently selected octave may be displayed by illuminating one of a plurality of LEDS 430. As shown in FIG. 4, one of the LEDS is indicated as corresponding to middle C (i.e., $C_4$). In such a manner, a user can quickly move up and down to different octaves and easily determine which octave is currently selected.

As shown in FIG. 4, the chord player 125 also includes guidance indicators 440 for providing user guidance as to a next chord player to actuate (e.g., when playing a particular chord progression). In a musical composition, a chord progression is a succession of chords. Chord progressions are the foundation of harmony in Western musical tradition from the common practice era of Classical music to the 21st century. Chord progressions are the foundation of Western popular music styles (e.g., pop music, rock music), traditional music, as well as genres such as blues and jazz. In these genres, chord progressions are the defining feature upon which melody and rhythm are built. In tonal music, chord progressions have the function of either establishing or otherwise contradicting a tonality, the technical name for what is commonly understood as the "key" of a song or piece.

Chord progressions, such as the common chord progression I-vi-ii-V, are usually expressed by Roman numerals (in upper and lower case corresponding to major and minor chords, respectively) in Classical music theory. For example, in rock and blues, musicians also often refer to chord progressions using Roman numerals, as this facilitates transposing a song to a new key. For example, rock and blues musicians often think of the 12-bar blues as consisting of I, IV, and V chords. In many styles of popular and traditional music, chord progressions are expressed using the name and "quality" of the chords. For example, the previously mentioned common chord progression I-vi-ii-V, in the key of C major, would be written as C major-A minor-D minor-G major. In the first chord, C major, the "C" indicates that the chord is built on the root note "C" and the word "major" indicates that a major chord is built on this "C" note.

In accordance with aspects of the disclosure, the guidance indicators 440 provide a user guidance as to a next chord player to actuate (e.g., when playing a particular chord progression). With this exemplary embodiment, the guidance indicators 440 include three LEDs 445, 450, 455, each of which can be illuminated to project any color of a selection of colors, or whose colors are fixed. For example, different colors may be illuminated under one or more different chord players on the chord board to indicate an interval from the currently actuated chord player. Thus, for example, a blue LED 450 may be used to indicate which chord player (e.g., of the twelve chord players) on the chord board will produce the V chord relative to the currently played chord player, and a yellow LED 455 may be used to indicate which chord player (e.g., of the twelve chord players) on the chord board will produce the IV chord relative to the currently played chord player. Additionally, the green LED 445 may be used to indicate a next chord player (e.g., of the twelve chord players) on the chord board to be played in accordance with a selected chord progression. Of course, it should be understood that the yellow and blue indicators could be used to indicate different intervals (e.g., ii).

Additionally LEDs may be used to indicate modulation (orange), parallel (red), related (white), and leading (purple) next chord players. For example, with modulation, in modern western music, musical pieces generally stay within a single key. Exceptions include adding chords related to a chord in a key. Another exception is moving to another key. The term used to indicate moving to another key in a way that is pleasing to the ears in western music is called modulation. An example of using the orange light would be to indicate that a certain chord can be used to modulate to another key in a way that is pleasing to the ears in western music.

For example, with Parallel, Related and Leading, in musical tuning and harmony, the Tonnetz (German for 'tone network') is a conceptual lattice diagram representing tonal space first described by Leonhard Euler in 1739. Various visual representations of the Tonnetz can be used to show traditional harmonic relationships in European classical music. Neo-Riemannian theory is a loose collection of ideas present in the writings of music theorists such as David Lewin, Brian Hyer, Richard Cohn, and Henry Klumpenhouwer. What binds these ideas is a central commitment to relating harmonies directly to each other, without necessary reference to a tonic.

Many of the masterpieces of European classical music did not conform to a tonal center, and thus did not conform to what we know as a key. Until this theory was more well understood, it was not understood how to understand how the great masters of these pieces were able to piece together the chords they used. Using the Tonnetz diagram, in conjunction with Neo-Riemannian theory, there can be seen three relationships between chords, called Relative, Leading and Parallel, which transcend traditional western music keys.

Relative relationships is the connection of the major chord to its relative minor chord. The two chords share two notes and diverge on the third. For instance, A minor is comprised of the notes A, C, E. Its relative chord is C major, which is comprised of C, E, G. Both chords share the notes C and E. Leading relationships share one tone and a second tone from the first chord is the leading tone to the second chord. For instance, C is comprised of C, E, G, and Em is comprised of E, G #, and B. B is the $7^{th}$ pitch in the diatonic of C, and is a leading pitch. So, Em is a leading chord to C. Parallel relationships go from a major chord to its minor and vice versa. A major and minor also share two tones and are separated only by one tone. For example, a C chord contains C, E, G, and a Cm chord contains C, Eb/D #, G. They share C and G. An example of using the red, white, and/or purple lights would be to indicate that a certain chord is in a parallel, related or leading relationship to the currently played chord. Thus, implementing aspects of the disclosure allows a player with little or no understanding of music theory to create chord sequences that are highly sophisticated and transcend traditional western music keys and traditional western chord sequences.

While not shown, the disclosure contemplates the chord board 100 may include a display to indicate a current legend for the guidance indicators 440 (which may be user configurable). The disclosure also contemplates other guidance indicators, such as a multi-colored illuminated LED ring around one (or more) of the pads 210, 215, 220.

Figure 5:
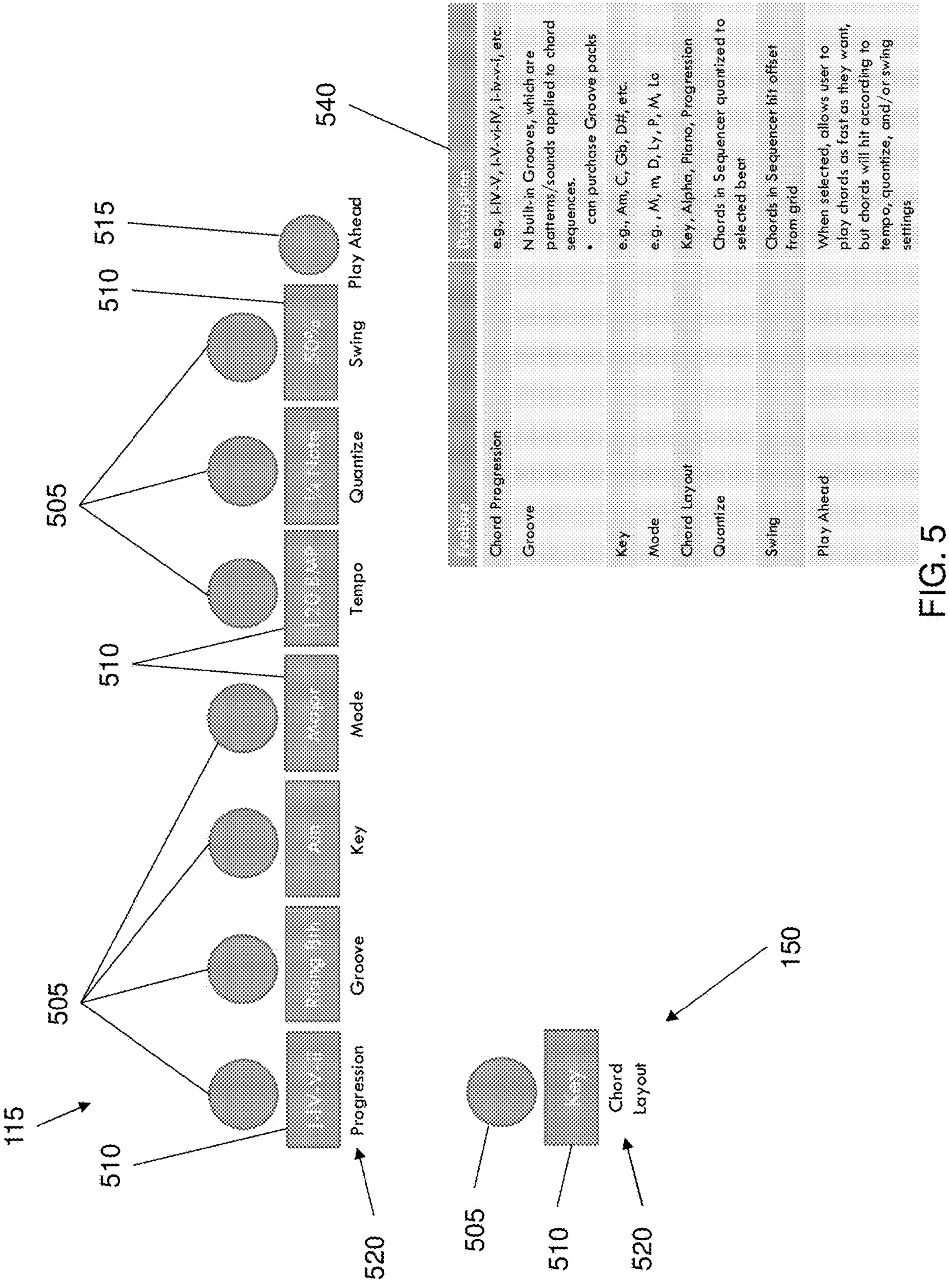
FIG. 5 shows an exemplary view of a control section of the chord board and chord section layout selection of the chord board in accordance with aspects of the disclosure.

FIG. 5 shows an exemplary view of a control section 115 of the chord board and chord section layout selector 150 of the chord board along with a description guide 540 in accordance with aspects of the disclosure. As shown in FIG. 5, the control section 115 includes a plurality of selection knobs 505 (e.g., rotary encoders) and displays 510 (e.g., LCDs) with respective static text labels 520 for selecting a variety of parameters. The respective knobs 505 are used to select the parameters, which are displayed on the corresponding displays 510. With an exemplary embodiment, the selectable parameters include: "progression," "groove," "key," "mode," "tempo," "quantize," and "swing." The "progression" parameter allows the user to select a particular progression (e.g., I-IV-V, I-V-vi-IV, i-iv-v-i, etc.) for the chord board. The "groove" parameter allows the user to select a particular groove for the chord board, e.g., patterns applied to the played chord progressions (for example, similar to a strumming pattern on a guitar or the way a trained pianist may play apply a pattern of keypresses to a series of chords to add interest). In music, groove is the sense of an effect ("feel") of changing pattern in a propulsive rhythm or sense of "swing." For example, in jazz, groove can be felt as a quality of persistently repeated rhythmic units, created by the interaction of the music played by a band's rhythm section (e.g., drums, electric bass or double bass, guitar, and keyboards). In embodiments, the selectable grooves may include, for example, rising $8^{th}$, rock, funky, etc. The idea of a groove is to apply real-time, non-destructive quantization to clips that is off the grid and nonlinear. For instance, in normal playing, with no Groove applied, a chord played on the chord player 125 will be held as a steady chord until the player releases the chord. If a Groove is applied, however, it will modulate the chord for the time the chord is being held. A Groove can be conceptualized as Morse Code, made up of a series of long and short pulses in a fixed pattern, together with variations in other parameters, as the case may be, such as in velocity, pitch-bend, etc. For instance, in Rising $8^{th}$, a Groove is comprised of eight subdivisions to a measure which start out soft (low velocity) and become louder (higher velocity) until all eight subdivisions are played and the measure is complete, then it starts softly again for the next measure with the next chord played. Another Groove may be a measure comprised of three long pulses and two short ones. Or two short ones followed by a long one and three short ones, all comprising a measure. Or a Groove could span more than one measure.

The "key" parameter allows the user to select a particular key for the chord board, e.g., A, A #/Bb, B, C, C #/Db, D, D #/Eb, E, F, F #/Gb, G, or G #/Ab. The "mode" parameter allows the user to select a particular mode for the selected key, e.g., Major (or Ionian), Minor (or Aeolian), Dorian, Phrygian, Lydian, Mixolydian, Locrian, or any number of modes used throughout the world. For example, other modes include Whole Tone, Whole-half Dim, Half-whole Dim, Minor Blues, Major Pentatonic, Minor Pentatonic, Harmonic Minor, Harmonic Major, Dorian #4, Phrygian Dominant, Melodic Minor, Lydian Augmented, Lydian Dominant, Super Locrian, 8-Tone Spanish, Bhairav, Hungarian Minor, Hirajoshi, In-San, Iwato, Kumoi, Pelog Selisir, Pelog Tembung, Messiaen 3, Messiaen 4, Messiaen 5, Messiaen 6, Messiaen. The selection of particular mode affects settings layout or other features. For example, when in Key or Progression layout, the Mode, Key and Progression parameters will determine which chords are assigned to which of the chord players 125. For example, the chords for A in minor mode are: a, bdim, C, d, e, F, G. The chords for A in major mode are: A, b, c #, D, E, f #, G #dim. The chords for A in Dorian mode are: a, b, C, D, e, f #dim, G. And so forth. The "tempo" parameter allows the user to select a particular tempo for the chord board, e.g., 120 BPM. The "quantize" parameter allows the user to select a particular quantize division for the chord board, e.g., ¼ note, such that the chord board quantizes to the selected beat. The "swing" parameter allows the user to select a particular swing setting (or amount of swing) for the chord board, e.g., 50%, such that the chord board plays chords in the sequencer that hit offset from grid. Swing refers to a technique that involves, for example, alternately lengthening and shortening the first and second consecutive notes in the two-part pulse-divisions in a beat. For example, in swing rhythm, the pulse is divided unequally, such that certain subdivisions (typically either eighth note or sixteenth note subdivisions) alternate between long and short durations.

As shown in FIG. 5, the control section 115 also includes a "play ahead" selection button 515. In accordance with aspects of the disclosure, when the play ahead button is selected (e.g., depressed), the chord board 100 allows the user to select chords as fast as they want while playing or at any speed while at rest (by depressing different pads of different chord players), but the chord will hit (or play) according to tempo, quantize, and swing settings when playing. That is, a user does not need to necessarily depress the pads in time with the rhythm, but the chord board 100 will play the chords as if the user depressed the pads in time with the rhythm or tempo. In accordance with aspects of the disclosure, by using the play ahead feature, a user who, for example, lacks rhythm (or the ability to keep time) or lacks the physical dexterity to move their fingers in time (e.g., a disabled person) can still easily play pleasing music, and thus enjoy the benefits of playing music. Additionally, the play ahead feature can act as an automatic player: for example, toggle-on Play Ahead and select the chord progress, choose the key and mode and the chords will play in progression upon starting the transport.

As shown in FIG. 5, the chord section layout selector 150 of the chord board 100 includes a selection knob 505 (e.g., rotary encoder) for selecting amongst a variety of chord layouts (e.g., Key, Alpha (or alphabetical), Piano, Progression) and a display 510 (e.g., LCD) for displaying the selected chord layout. As shown in FIG. 5, the display 510 includes a static text label 520 (e.g., "Chord Layout"). This, in conjunction with the Progression, Key and Mode parameters, determine which chords are assigned to each chord player 125.

Figure 6:
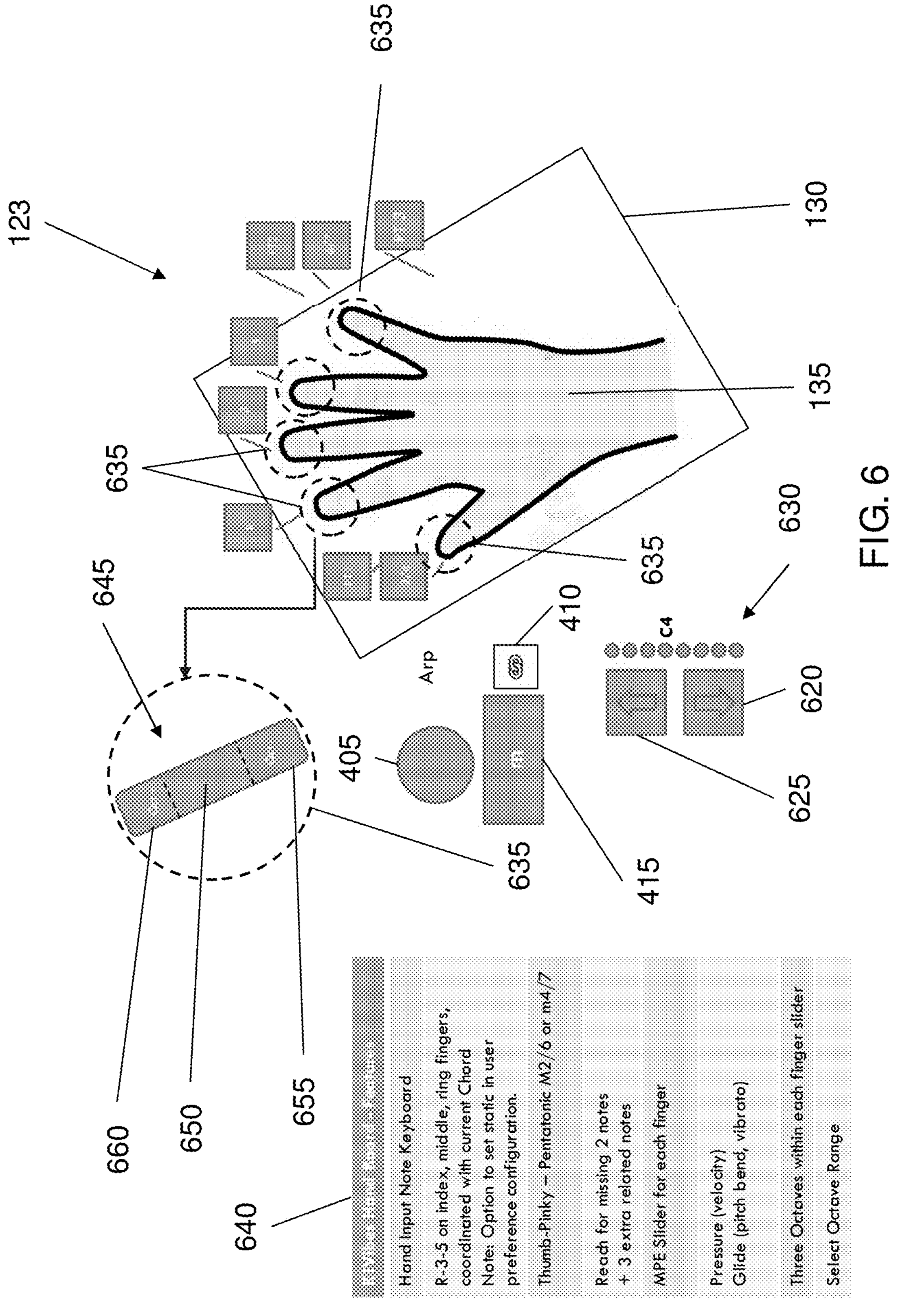
FIG. 6 shows an exemplary view of the note section of the chord board in accordance with aspects of the disclosure.

FIG. 6 shows an exemplary view of the note player 123 (or hand board) along with a description guide 640 in accordance with aspects of the disclosure. As shown in FIG. 6, the fingers of a user's hand 135 may be used to actuate individual notes. The note player 123 includes a sensor pad 130 that may be manipulated by a user's hand 135 (e.g., right hand). It is to be understood that the depiction of sensor pad 130 is an example embodiment and is not intended to limit implementation of the disclosed note player 123. In embodiments, the sensor pad 130 includes an MPE slider 645 for each finger within respective regions 635 of the sensor pad 130. In an embodiment, each MPE slider includes a central region 650, an octave plus region 660 and an octave minus region 655. Depressing a finger on the central region 650 will produce the selected note, depressing a finger on the octave plus region 660 will produce a note an octave higher than the selected note, and depressing a finger on the octave minus region 655 will produce a note an octave lower than the selected note. Thus, as depicted with this exemplary embodiment, there is a range of three octaves within each finger slider. The MPE slider can detect pressure (to control velocity, for example) and glide (to control pitch bend, vibrato).

Additionally, the hand board 110 (or note player) includes an octave up button 625 and an octave down button 620 for selecting different octaves for the hand board 123 (or note player). As shown in FIG. 6, by pressing the octave up button 625 or the octave down button 620, a user can quickly change the octave of the hand board 123. With the exemplary embodiment, the currently selected octave may be displayed by illuminating one of a plurality of LEDS 630. As shown in FIG. 6, one of the LEDS is indicated as corresponding to middle C (i.e., $C_4$). In such a manner, a user can quickly move up and down to different octaves and easily determine which octave is currently selected for the hand board 123. Additionally, as shown in FIG. 6, in embodiments, the note player 123 also includes an arpeggiator section having a rotary encoder 405 for selecting a particular arpeggiation pattern (e.g., from n patterns), a display 415 for indicating the selected arpeggiation pattern for the note player 123, and a link button 410 for linking together arpeggiators from one or more chord players 125 on the chord board.

As shown in FIG. 6, the respective fingers of a user's hand 135 are used to actuate individual notes (e.g., notes of the pentatonic scale) by contacting different regions of the sensor pad 130. For example, with an exemplary embodiment, depressing the index finger on the corresponding index finger MPE slider will produce the root note (corresponding with the currently-played chord played with the other hand on a chord player 125). Additionally, in some embodiments, there may be an option to set the finger layout of the hand board to be static (e.g., in a user-selected key) in a user preference configuration (so that the finger layout of the hand board is not linked to the chord being currently played on the chord board 100).

Further, as shown in FIG. 6, depressing the middle finger on the corresponding middle finger MPE slider will produce the 3rd of the root note and depressing the ring finger on the corresponding ring finger MPE slider will produce the fifth of the root note. Additionally, the thumb and pinky may be used to produce the pentatonic M2/6 or m4/7 notes of the root note. For example, regarding the pinky-thumb sliders, the major pentatonic scale is made up of root, 2nd, 3rd, 5th, and 6th degrees of the major scale (the 4th and 7th scale degrees are left out). In contrast, the minor pentatonic scale is made up of root, b3rd, 4th, 5th, and b7 degrees of the minor scale (the 2nd and 6th scale degrees are left out). In accordance with aspects of the disclosure, the 2/4 provides access to reach to the missing 4th scale degree from the major pentatonic or the missing 2nd scale degree from the minor pentatonic scale. Similarly, the 6/7 provides access to reach to the missing 7th scale degree from the major pentatonic or the missing 6th scale degree from the minor pentatonic scale. It should be understood that while FIG. 6 shows an exemplary configuration of correspondence between fingers and the notes, in some embodiments, the configuration of the hand board 123 may be user-configurable (e.g., via an associated app).

The sensor pad 130 may also include additional regions 635 for the missing 2 notes (i.e., those notes not in the pentatonic scale) and non-diatonic passing tones (PT1, PT2, and PT3) or accidentals that may be useful when soloing. Additionally, the sensor pad 130 may be configured to detect movements of other parts of the user's hand. For example, the sensor pad 130 may be configured to include regions to detect a left-side heel/palm contact, and a right-side heel/palm contact, for example, to shift octaves downwardly and upwardly. With such heel/palm detection regions, a user could even more easily switch between octaves (or adjust other parameters, such as volume, modulation, effect mix, delay time, etc.)

Figure 7:
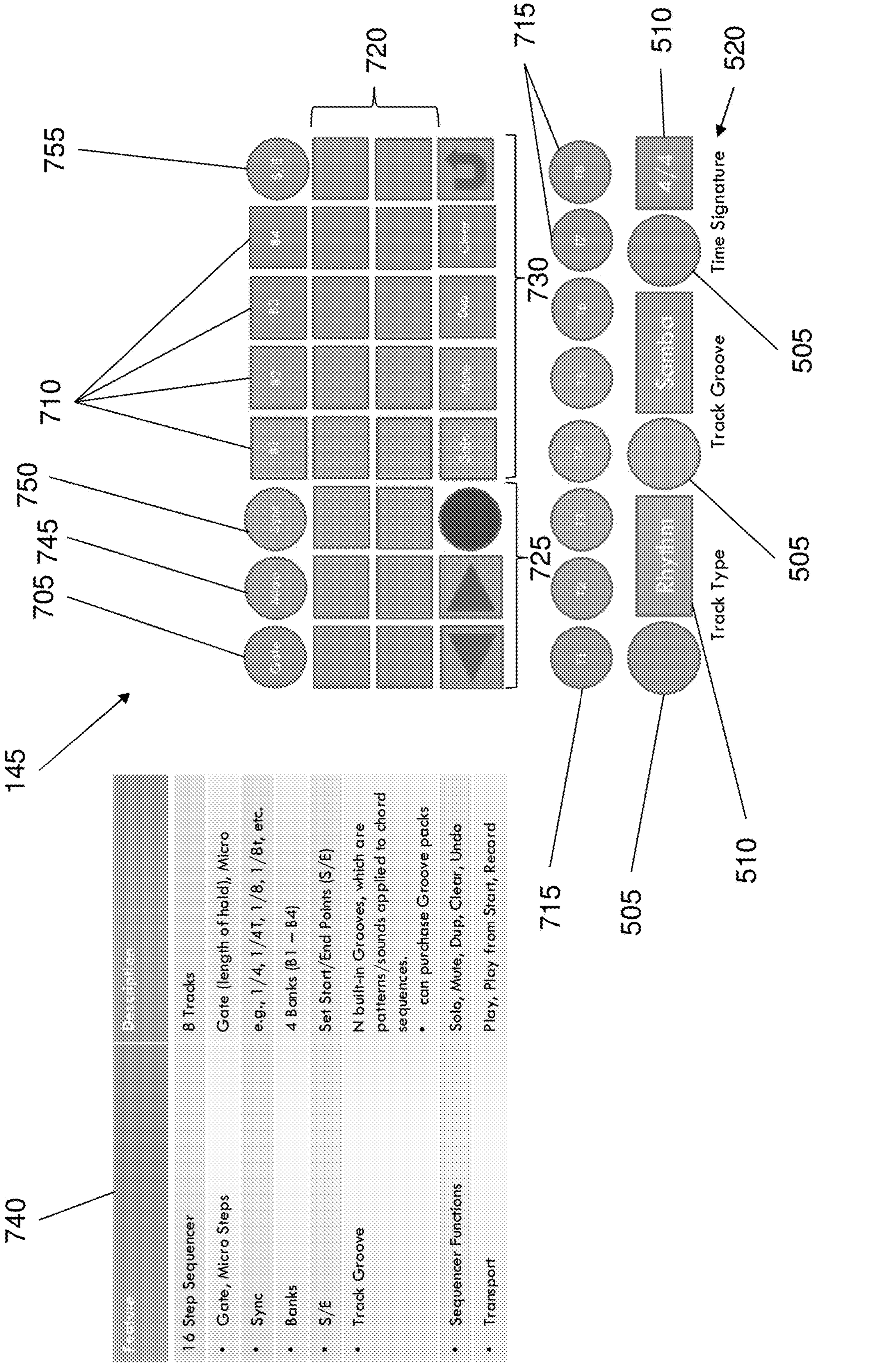
FIG. 7 shows an exemplary view of a sequencer section of the chord board in accordance with aspects of the disclosure.

FIG. 7 shows an exemplary view of a sequencer section 145 of the chord board along with a description guide 740 in accordance with aspects of the disclosure. The sequencer allows a user to set a few parameters, including a chord progression and a first note, for example, to create a 16-bar sequence automatically. As shown in FIG. 7, the sequencer section 145 may be a sixteen-step sequencer having eight tracks. The exemplary sequencer section 145 includes eight illuminable track buttons 715, one for each of the eight tracks, and sixteen illuminable pads 720, one for each of the steps. The sequencer may have N built-in patterns/sounds per track (and may be configured to receive additional purchased mode packs).

The sequencer section 145 includes a gate controller 705 (e.g., an illuminated pad or button or push-button rotary encoder) for adjusting the gate (e.g., length of hold of the gate). For example, the gate value of a note is how many steps it sounds for. A user may press the gate push button to allow the length of a step to be edited (e.g., via rotation of the rotary controller or toggling through options via depressing button).

The sequencer section 145 may also include a micro steps controller 745 for adjusting the micro steps. The interval between consecutive steps is further subdivided into six micro steps. The micro steps may be used for "off-beat" timing of chord and drum hits, for example.

The sequencer section 145 also includes a sync controller 750 for adjusting the sync (e.g., ¼, ¼T, ⅛, ⅛*t*, etc.) The sync sets the speed of the sequencer steps relative to the tempo. For example, if the sync is "¼", each step is a quarter note, if sync is "⅛", each step is an eighth note, and if "⅛t", each note is an eighth note triplet.

The sequencer section 145 also includes a S/E controller 755 for adjusting within the sequencer which pad the sequencer starts and/or ends on. For example, of the sixteen steps of the sequencer, using the S/E rotary controller 755, the sequencer can be adjusted to start on step 2 and end on step 10 for a nine-step sequence.

The exemplary sequencer section 145 also includes four illuminated bank pads/buttons 710 for accessing four different banks (B1-B4) of the sequencer, allowing for a total of up to 64 steps per track. The sequencer section 145 also includes transport controls 725 (e.g., Play, Play from Start, and Record) and sequencer function controls 730 (e.g., Solo, Mute, Duplicate, Clear, and Undo). Pressing Play while the sequencer is playing pauses the sequencer. Pressing Play again will resume from pause, while pressing Play from Start will restart the sequence from the beginning.

As shown in FIG. 7, the exemplary sequencer section 145 also includes control knobs 505 (e.g., rotary encoders) and corresponding displays 510 (e.g., LCDs) with static labels 520 for adjusting track type, track groove, and time signature of the sequencer. In exemplary embodiments, the selectable track types may include: rhythm track, bass track, solo track, etc. In exemplary embodiments, the selectable track grooves may include: samba, salsa, rhumba, etc. In exemplary embodiments, the selectable time signatures may include: 4/4, 6/8, 5/4, 7/4, 11/4, 2/4, etc. The track groove is the same as groove discussed above (see FIG. 5), but is specific for the track in the sequencer.

Figure 8A:
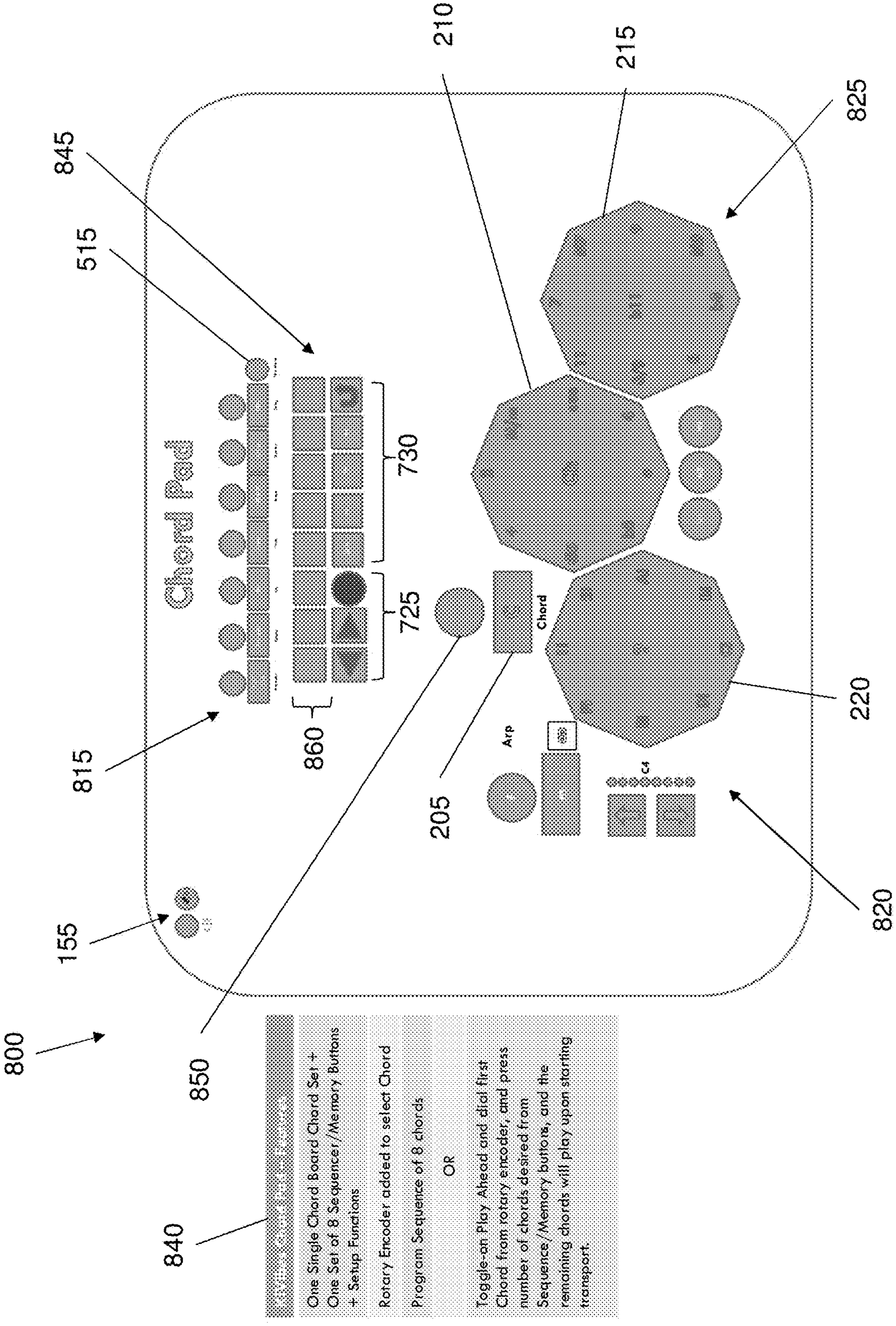
FIG. 8A shows an exemplary depiction of a chord pad including a single chord player section in accordance with aspects of the disclosure.

FIG. 8A shows an exemplary depiction of a chord pad 800 along with a features guide 840 in accordance with further aspects of the disclosure. As shown in FIG. 8A, the chord pad 800 includes a power and volume (mute) control section 155 (including a power switch and a mute switch), a setup control section 815, and a sequencer control section 845. In accordance with aspects of the disclosure, the chord pad 800 includes a chord player section 820, which is operable to produce chords by a user depressing one or more pads with their fingers.

As shown in FIG. 8A, the chord player section 820 includes one chord player 825, which via selection by a chord selection knob 850 (e.g., rotary encoder), is operable to assign any of the twelve tones (A-A #/Bb-B-C-C #/Db-D-D #/Eb-E-F-F #/Gb-G-G #/Ab) to the chord player 125. The chord player 825 includes a chord root note display 205, which is operable to display the currently-corresponding chord and root note for the chord player 825. As shown in FIG. 8A, the chord player 825 includes the first pad (or pad 1) 210, the second pad (or pad 2) 215, and the third pad (or pad 3) 220. With the exemplary configuration shown in FIG. 8A, the chord pad 800 is set to play a C chord (as indicated in the chord root note display 205). A user, however, can rotate chord selection knob 850 so that the chord player 825 is configured to play a chord with a different root note (e.g., $F^{\#}$ chord).

In accordance with aspects of the disclosure, the chord pad 800 can use the sequencer section 845 to program a sequence of 8 chords, or a user may press play ahead button 515 to toggle-on the Play Ahead function, select a chord progression, choose the key and mode, and the chords will automatically play in progression upon starting the transport. The sequencer section 845 includes transport controls 725 (e.g., Play, Play from Start, and Record) and sequencer function controls 730 (e.g., Solo, Mute, Duplicate, Clear, and Undo). The exemplary sequencer section 845 includes eight illuminated pads 860, one for each of the steps. In accordance with additional aspects of the disclosure, the chords may also be selected when at rest (at any speed) and then played back at the selected tempo.

Figure 8B:
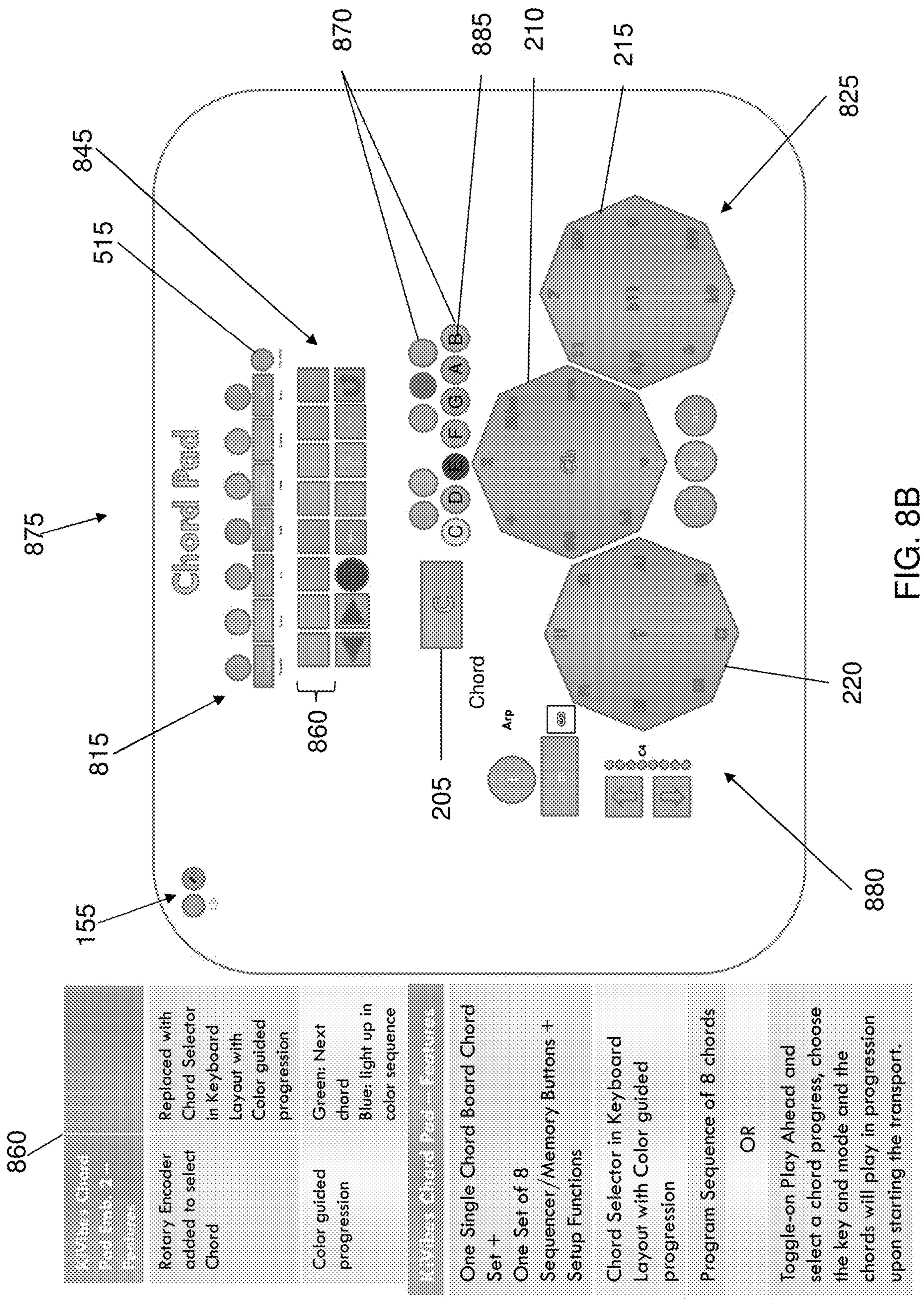
FIG. 8B shows another exemplary depiction of a chord pad including a single chord player section in accordance with aspects of the disclosure.

FIG. 8B shows another exemplary depiction of a chord pad 875 including a single chord generator section 880 in accordance with aspects of the disclosure. In contrast to the chord pad 800 (which uses a chord selection knob (e.g., rotary encoder) to select a chord root note for the chord player 825), the chord pad 875 includes a chord selector 865 in a keyboard layout with a plurality of illuminable push buttons 870 (e.g., twelve). While in the depiction of FIG. 8B, the push buttons 870 are provided with note labels (e.g., A, B, C, D, E, F, and G), it should be understood that the push buttons 870 may or may not include note labels 885. Additionally, in embodiments, the note labels 885 may be static or may be user-configurable. By depressing one of the push buttons 870, a user may select a new root chord note for the chord player 825 (which will then be displayed in the chord root note display 205).

As shown in FIG. 8B, each of the push buttons 870 may be illuminated with one or more different colors, for example, to indicate a currently selected chord root note, or a next chord root note (e.g., for a selected progression). For example, the yellow color may be used to indicate a currently selected chord root note. As shown in FIG. 8B, the push button 870 illuminated yellow corresponds with the "C" root note (as indicated by the note label 885), which corresponds with the chord root note indicated by the chord root note display 205. Additionally, with an exemplary and non-limiting embodiment, the green and blue colors may be used as a color-guided progression, to indicate a next chord, and further next chord in the progression, respectively. As the moment for the next chord root note arrives, the user may depress the green-illuminated push button 870, thus changing the currently selected chord root note (in the example of FIG. 8B, from a "C" root note to an "G #" root note. After, the user depresses the push button 870 illuminated green, the push button 870 currently illuminated blue may then switch to green, to indicate a next push button 870 (e.g., in a selected chord progression). Additionally, in a similar manner to that explained above, LEDs of the push button 870 may be used to indicate chord selections for modulation (orange), parallel (red), related (white), and leading (purple) based on the currently selected chord root note (indicated by the chord root note display 205).

Figure 9:
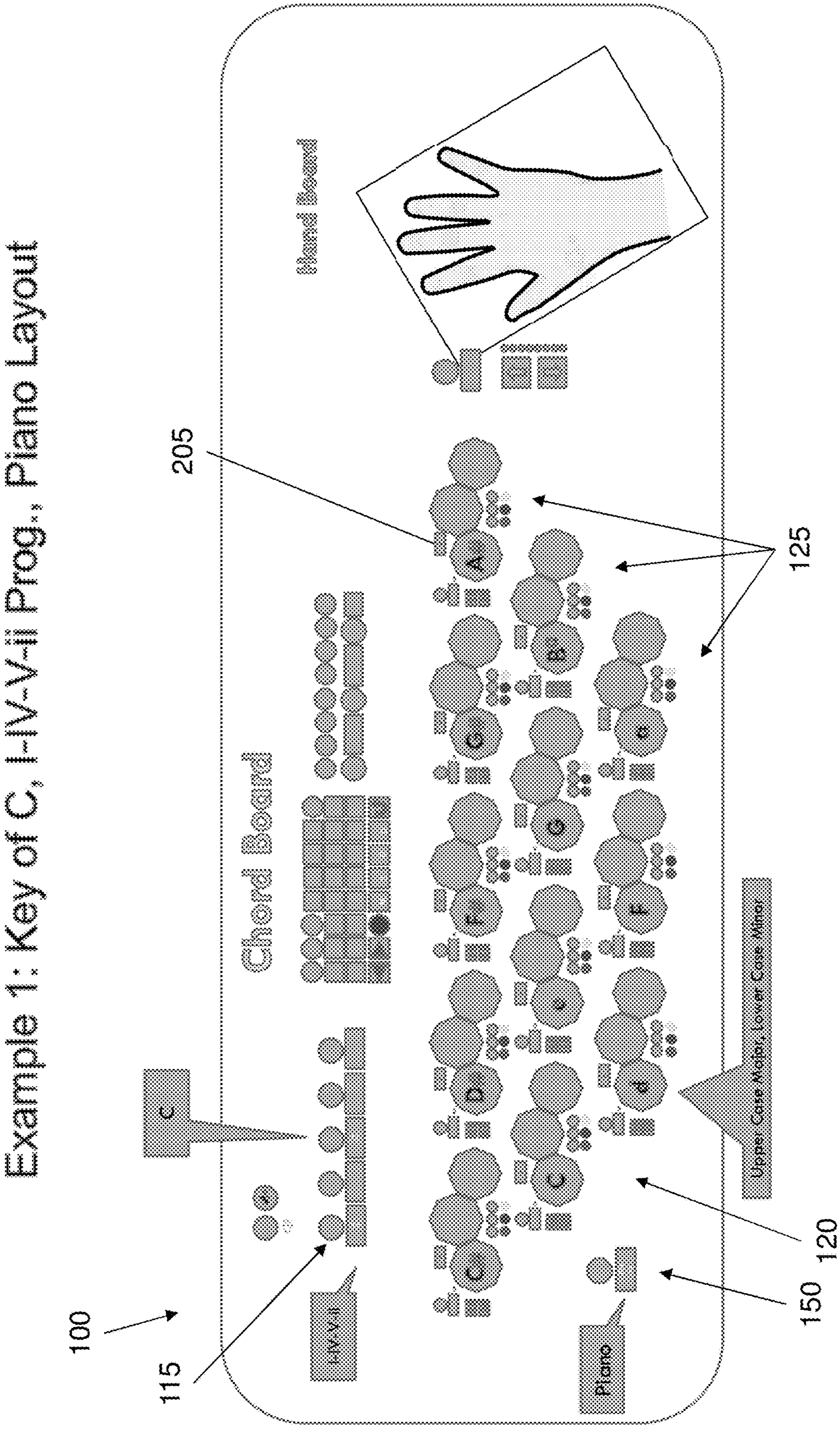
FIG. 9 shows an exemplary layout of the chord board configured in the key of C, in a I-IV-V-ii progression, and a piano layout in accordance with aspects of the disclosure.

As shown in FIG. 9 (and FIGS. 10-14), the chord board 100 includes a chord player section 120 having twelve individual chord players 125, with each chord player 125 corresponding to one of the twelve tones (A-A #/Bb-B-C-C #/Db-D-D #/Eb-E-F-F #/Gb-G-G #/Ab). As noted above, it should be understood that while each of the chord players 125 shown in the exemplary embodiment of FIG. 9 (and FIGS. 10-14) depicts a chord root note displayed on a pad thereof, these depicted root notes on the pads are shown in FIG. 9 (and FIGS. 10-14) in order to facilitate an understanding of the disclosure, and with this exemplary embodiments, are not actually displayed upon any of the pads. Instead, as described above, each of the chord players 125 includes a dedicated chord root note display 205, which is operable to display the currently-corresponding chord and chord root note corresponding to its respective chord player 125.

In accordance with further aspects of the disclosure, the association between each of the twelve tones (or root notes) and each of the chord players 125 is configurable in different layouts (e.g., based upon a selected key and/or a desired layout). As shown in FIG. 9 (and FIGS. 10-14), the chord board 100 includes the layout selector 150, which is operable to select a layout of the chord players 125 (i.e., select an association between each of the twelve tones (or chord root notes) and each of the chord players 125) from amongst a variety of layouts (e.g., Key, Alpha, Piano, Progression). As shown in FIG. 9 (and FIGS. 10-14), the chord board 100 includes the setup control section 115, to select a key and a progression, amongst other parameters.

FIG. 9 shows an exemplary layout of the chord board 100 configured in the key of C major, in a I-IV-V-ii progression, and a piano layout in accordance with aspects of the disclosure. As shown in FIG. 9, the setup control section 115 currently shows a selection of the key of C, and a I-IV-V-ii progression. Additionally, the layout selector 150 currently shows a selection of Piano. In accordance with aspects of the disclosure, with a Piano layout, the chord board mimics a piano layout—with the sharp/flat root notes (which correspond to the black piano keys) in the back row of chord players 125 behind the non-sharp/flat root notes (which correspond to the white piano keys) in the two front rows of chord players 125. The left-most chord player arranged in the middle row is configured as the C chord player and the other chord players in the front two rows ascend from C (i.e., d, e, F, G, a, B). Additionally, as shown in FIG. 9, the uppercase letters represent a major chord and the lower case letters represent a minor chord. Thus, with the exemplary layout and key, pressing the center portion of the first pad (or pad 1) of the C chord player (to the upper right of the pad labeled "C") will produce a C major chord, whereas pressing the center portion of the first pad (or pad 1) of the D chord player (to the upper right of the pad labeled "d") will produce a D minor chord.

Figure 10:
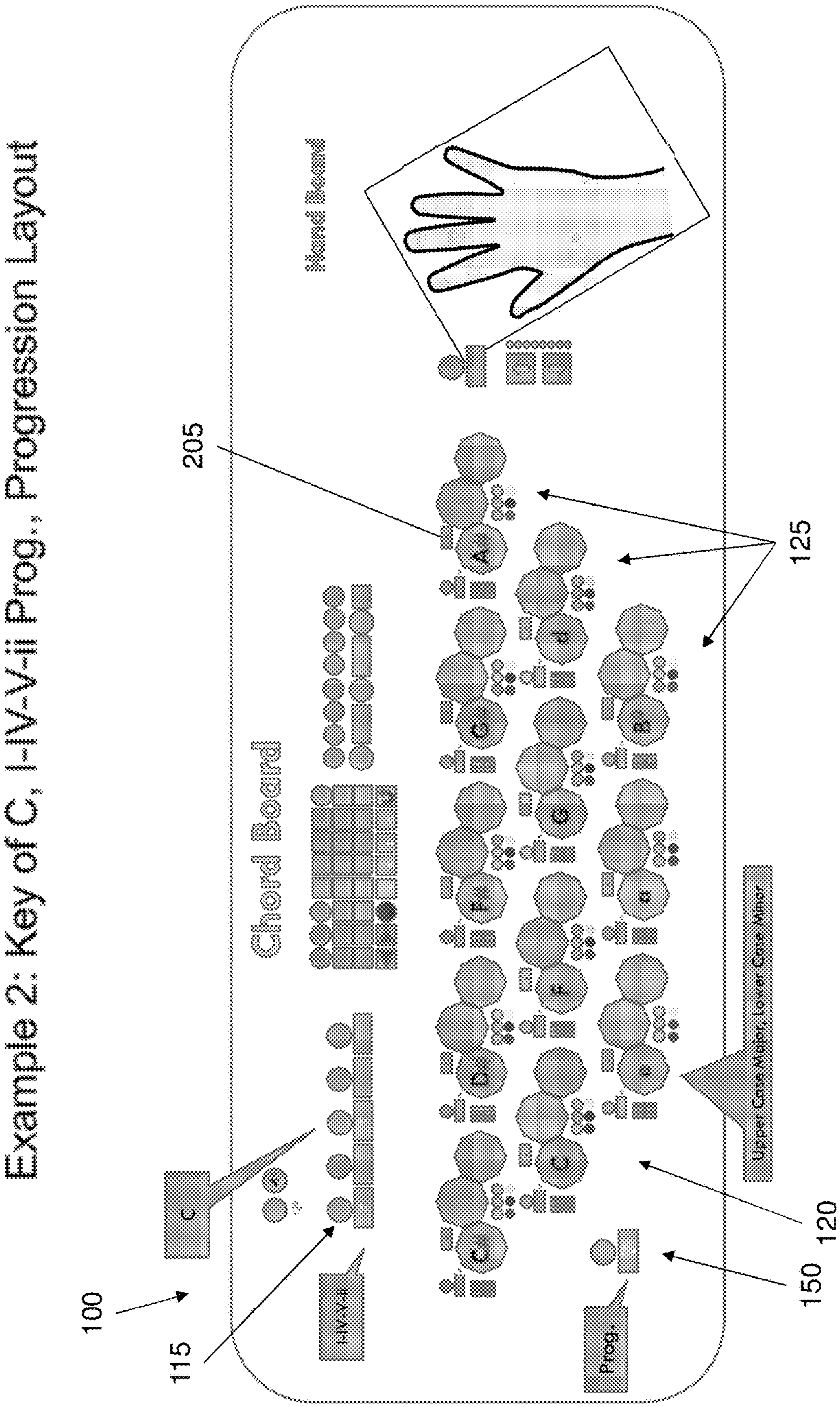
FIG. 10 shows an exemplary layout of the chord board configured in the key of C, in a I-IV-V-ii progression, and a progression layout in accordance with aspects of the disclosure.

FIG. 10 shows an exemplary layout of the chord board 100 configured in the key of C major, in a I-IV-V-ii progression, and a progression layout in accordance with aspects of the disclosure. As shown in FIG. 10, the setup control section 115 currently shows a selection of the key of C major, and a I-IV-V-ii progression. Additionally, the layout selector 150 currently shows a selection of Prog. (for progression). In accordance with aspects of the disclosure, with a progression layout, the chord board 100 arranges the chords to easily play the chord progression (e.g., in the order of the selected chord progression from left-to-right on the chord board 100).

With a I-IV-V-ii progression in the key of C major, the chords are C major (I)-F major (IV)-G major (V)-D minor (ii). Thus, as shown in FIG. 10, with the chord board 100 in a progression layout in the key of C major, the left-most chord player 125 arranged in the middle row is configured as a C major chord player, i.e., the I chord (with the center portion of the first pad (or pad 1) producing a C major chord), the next chord player 125 in the middle row is configured as a F chord player, i.e., the IV chord (with the center portion of the first pad (or pad 1) producing a F major chord), the next chord player 125 in the middle row is configured as a G chord player, i.e., the V chord (with the center portion of the first pad (or pad 1) producing a G major chord), and the last chord player 125 in the middle row is configured as a D chord player, i.e., the ii chord (with the center portion of the first pad (or pad 1) producing a D minor chord). As shown in FIG. 10, the sharp chords (i.e., C#, D#, F#, G#, and A#) are arranged in the back row of chord players, and the remaining chords (e, a, and B°) are arranged in the front row of chord players 125.

In accordance with aspects of the disclosure, when the chord board 100 is configured with a progression layout, a user can very easily know where on the chord board 100 to move their hand (and fingers) next in order to play the next chord in a chord progression. For example, a user simply moves their left hand from left to right along the middle row of chord players 125 to play the progression (and then repeat). In such a manner, the chord board provides a more accessible way of creating and enjoying music.

Figure 11:
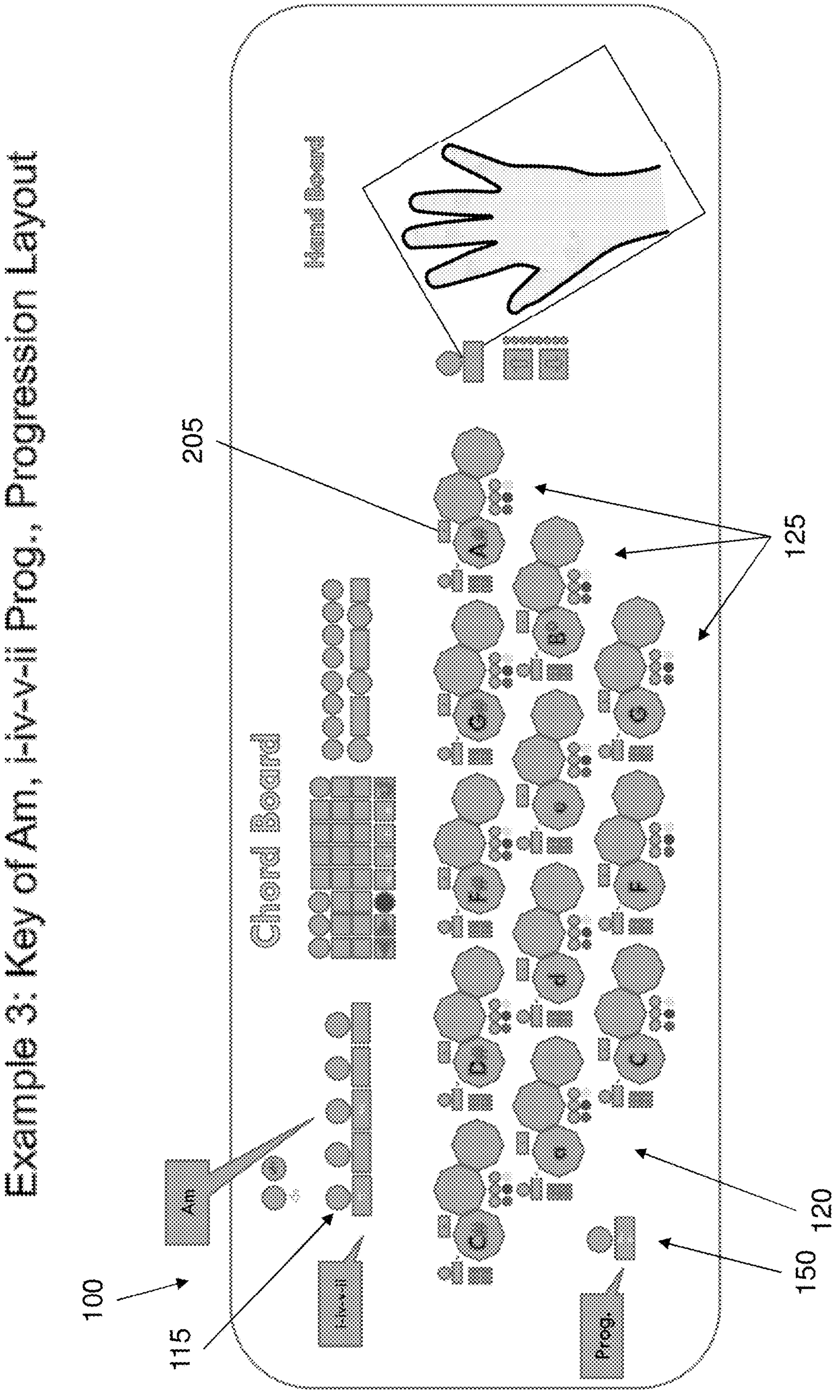
FIG. 11 shows an exemplary layout of the chord board configured in the key of Am, in a i-iv-v-ii progression, and a progression layout in accordance with aspects of the disclosure.

FIG. 11 shows an exemplary layout of the chord board configured in the key of A minor, in a i-iv-v-ii progression, and a progression layout in accordance with aspects of the disclosure. As shown in FIG. 11, the setup control section 115 currently shows a selection of the key of A minor, and a i-iv-v-ii progression. Additionally, the layout selector 150 currently shows a selection of Prog. (for progression).

With a i-iv-v-ii progression in the key of A minor, the chords are A minor (i)-D minor (iv)-e minor (v)-B diminished (ii). Thus, as shown in FIG. 10, with the chord board 100 in a progression layout in the key of A minor, the left-most chord player 125 arranged in the middle row is configured as an A minor chord player, i.e., the i chord (with the center portion of the first pad (or pad 1) producing an A minor chord), the next chord player 125 in the middle row is configured as a D minor chord player, i.e., the iv chord (with the center portion of the first pad (or pad 1) producing a D minor chord), the next chord player 125 in the middle row is configured as a E minor chord player, i.e., the v chord (with the center portion of the first pad (or pad 1) producing a E minor chord), and the last chord player 125 in the middle row is configured as a B diminished chord player, i.e., the ii chord (with the center portion of the first pad (or pad 1) producing a B diminished chord). As shown in FIG. 11, the sharp chords (i.e., C#, D#, F#, G#, and A#) are arranged in the back row of chord players 125, and the remaining chords (C, F, and G) are arranged in the front row of chord players 125.

As noted above, in accordance with aspects of the disclosure, when the chord board 100 in configured with a progression layout, a user can very easily know where on the chord board 100 to move their hand (and fingers) next in order to play the next chord in a chord progression. Moreover, a user can easily switch between different keys while playing the same progression. In such a manner, the chord board provides a more accessible way of creating and enjoying music. In comparing the layouts of FIGS. 9-11, it can be appreciated how the chord board can easily be reconfigured to play in different keys and/or different progressions in accordance with aspects of the disclosure.

Figure 12:
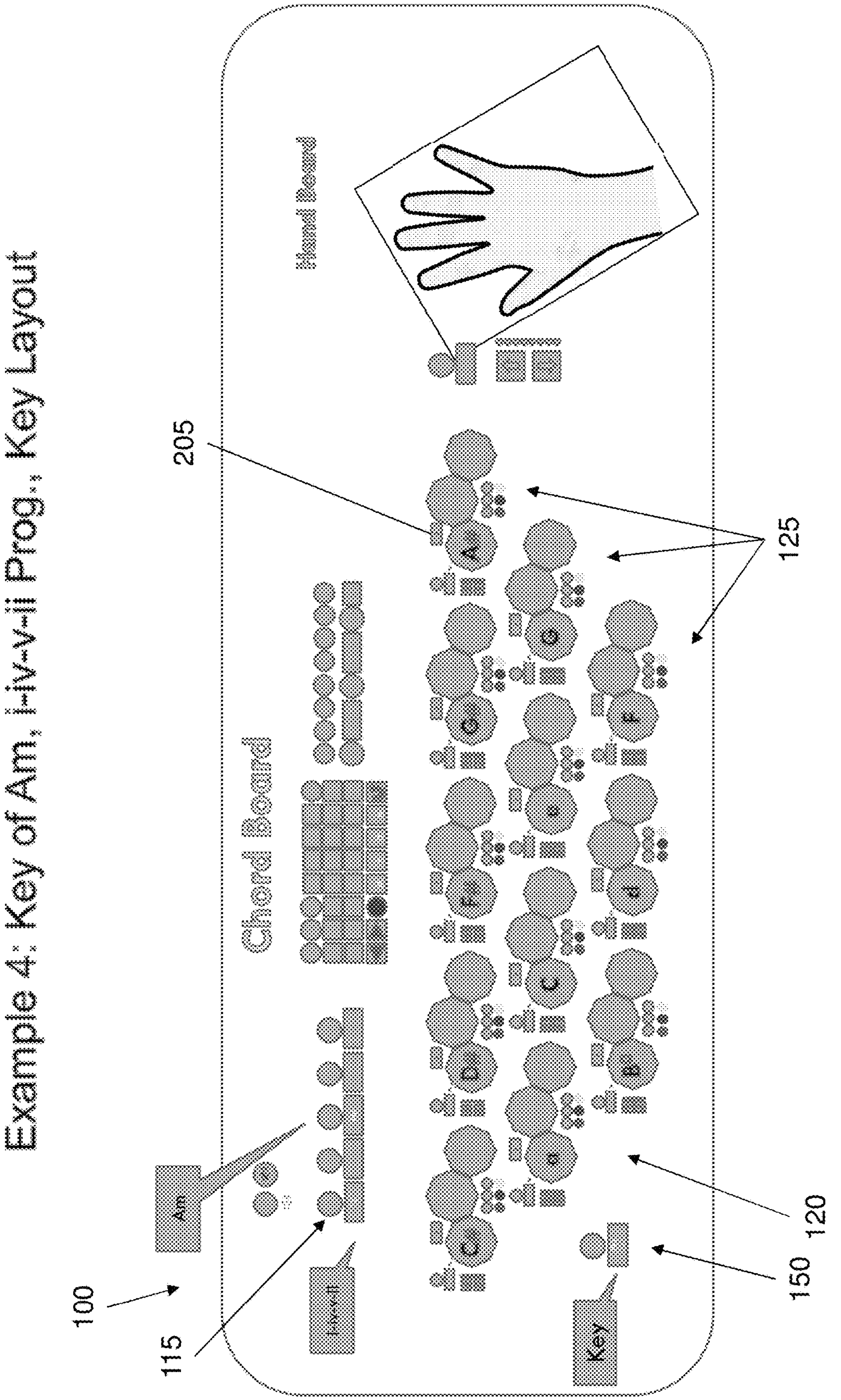
FIG. 12 shows an exemplary layout of the chord board configured in the key of Am, in a i-iv-v-ii progression, and a key layout in accordance with aspects of the disclosure.

FIG. 12 shows an exemplary layout of the chord board 100 configured in the key of A minor, in a i-iv-v-ii progression, and a key layout in accordance with aspects of the disclosure. As shown in FIG. 12, the setup control section 115 currently shows a selection of the key of A minor, and a i-iv-v-ii progression. Additionally, the layout selector 150 currently shows a selection of Key. In accordance with aspects of the disclosure, with a key layout, the chord board 100 arranges the chords in the first two rows of chord players 125 from left-to-right on the chord board 100 starting with the chord selected by the key (via the setup control section 115). The chords in the first two rows of chord players then ascend based on the selected Key.

Thus, as shown in FIG. 12, in the key of Am and Key layout, the first two rows of chord players 125 from left-to-right are an A minor chord player (with the center portion of the first pad (or pad 1) producing an A minor chord), the next chord player 125 is configured as a B diminished chord player (with the center portion of the first pad (or pad 1) producing a B diminished chord), the next chord player 125 is configured as a C major chord player (with the center portion of the first pad (or pad 1) producing a C major chord), the next chord player 125 is configured as a D minor chord player (with the center portion of the first pad producing a D minor chord), the next chord player 125 is configured as an E minor chord player (with the center portion of the first pad (or pad 1) producing an E minor chord), the next chord player 125 is configured as a F major chord player (with the center portion of the first pad (or pad 1) producing an F major chord), and the last chord player 125 is configured as a G major chord player (with the center portion of the first pad (or pad 1) producing an G major chord). As shown in FIG. 12, the sharp chords (i.e., C#, D#, F#, G#, and A#) are arranged in the back row of chord players 125. In accordance with aspects of the disclosure, when configured in the key layout, a user can easily move between the different chords in the selected key. In such a manner, the chord board 100 provides a more accessible way of creating and enjoying music.

Figure 13:
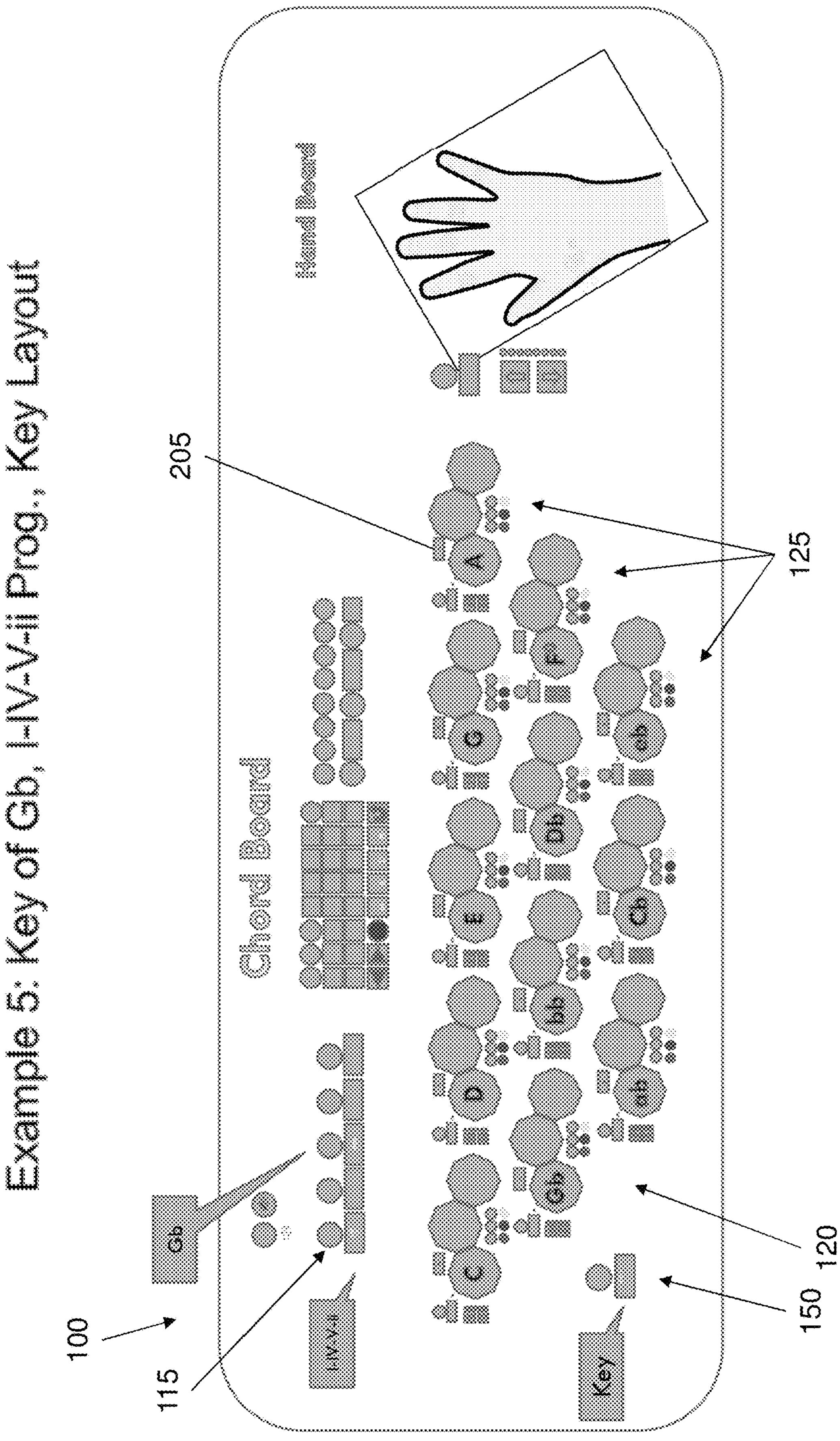
FIG. 13 shows an exemplary layout of the chord board configured in the key of Gb, in a I-IV-V-ii progression, and a key layout in accordance with aspects of the disclosure.

FIG. 13 shows an exemplary layout of the chord board configured in the key of Gb (or G flat) major, in a I-IV-V-ii progression, and a key layout in accordance with aspects of the disclosure. As shown in FIG. 13, the setup control section 115 currently shows a selection of the key of Gb major, and a I-IV-V-ii progression. Additionally, the layout selector 150 currently shows a selection of Key. In accordance with aspects of the disclosure, with a key layout, the chord board 100 arranges the chords in the first two rows of chord players 125 from left-to-right on the chord board 100 starting with the chord selected by the key (via the setup control section 115). The chords in the first two rows of chord players then ascend based on the selected key.

Thus, in the key of Gb and key layout, the first two rows of chord players 125 from left-to-right are an Gb major chord player (with the center portion of the first pad (or pad 1) producing an Gb major chord), the next chord player 125 is configured as an Ab minor chord player (with the center portion of the first pad (or pad 1) producing an Ab minor chord), the next chord player 125 configured as a Bb minor chord player (with the center portion the first pad (or pad 1) producing a Bb minor chord), the next chord player 125 is configured as a Cb major (or B) chord player (with the center portion of the first pad (or pad 1) producing a Cb major chord), the next chord player 125 is configured as a Db major chord player (with the center portion of the first pad (or pad 1) producing a Db major chord), the next chord player 125 is configured as an Eb minor chord player (with the center portion of the first pad (or pad 1) producing a Eb minor chord), and the last next chord player 125 is configured as F diminished chord player (with the center portion of the first pad (or pad 1) producing an F diminished chord). As shown in FIG. 12, the remaining chords (i.e., C, D, E, G, and A) are arranged in the back row of chord players 125.

Figure 14:
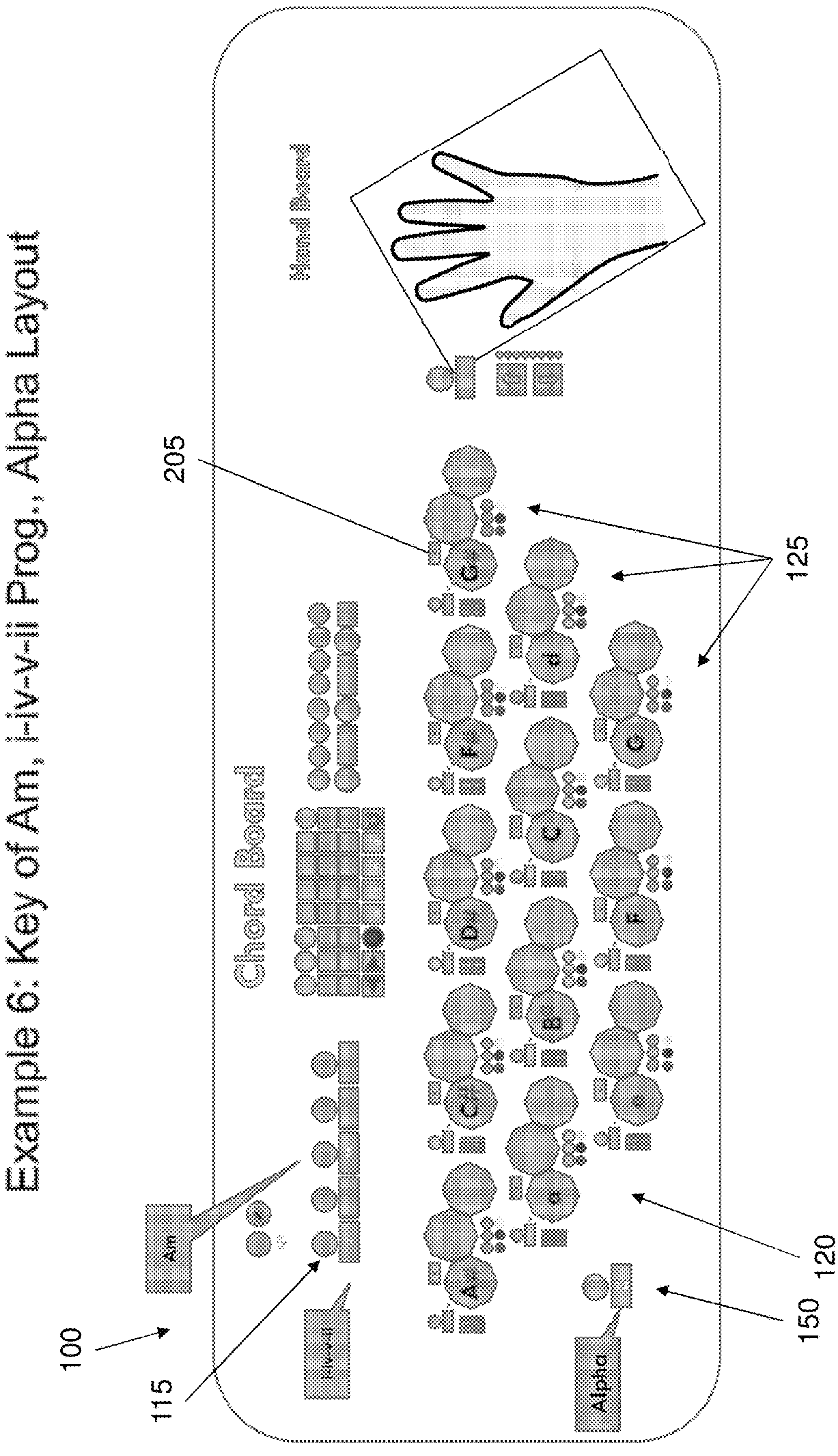
FIG. 14 shows an exemplary layout of the chord board configured in the key of A minor, in a i-iv-v-ii progression, and an alpha (or alphabetical) layout in accordance with aspects of the disclosure.

FIG. 14 shows an exemplary layout of the chord board 100 configured in the key of A minor, in a i-iv-v-ii progression, and an Alpha (or alphabetical) layout in accordance with aspects of the disclosure. As shown in FIG. 14, the setup control section 115 currently shows a selection of the key of A minor, and a i-iv-v-ii progression. Additionally, the layout selector 150 currently shows a layout selection of Alpha. In accordance with aspects of the disclosure, with an Alpha (or alphabetical) layout, the chord board 100 arranges the chords in the first two rows of chord players 125 alphabetically left-to-right on the chord board 100. Thus, the chord players 125 in the middle row are A, B, C, and D, and the chord players 125 in the front row are E, F, and G. As shown in FIG. 14, the sharp chords (i.e., $A^{\#}$, $C^{\#}$, $D^{\#}$, $F^{\#}$, and $G^{\#}$) are arranged in the back row of chord players 125. In accordance with aspects of the disclosure, in the alpha layout, the chord layout arrangement does not change (for example, based on a selected progression setting). Instead, the left most chord player 125 in the middle row is always configured as an A minor chord player, and the right most chord player 125 in the front row is always configured as an G major chord player (while changing the key may impact whether the center of the first pad (or pad 1) produces a major chord, a minor chord, or a diminished chord).

Thus, as shown in FIG. 14, with the chord board 100 in an alpha layout in the key of Am, the left-most chord player 125 arranged in the middle row is configured as an A minor chord player (with the center portion of the first pad (or pad 1) producing an A minor chord), the next chord player 125 in the middle row is configured as a B diminished chord player (with the center portion of the first pad (or pad 1) producing a B diminished chord), the next chord player 125 in the middle row is configured as a C major chord player (with the center portion of the first pad (or pad 1) producing a C major chord), and the last chord player 125 in the middle row is configured as a D minor chord player (with the center portion of the first pad (or pad 1) producing a D minor chord).

The left-most chord player 125 in the front row is configured as an E minor chord player (with the center portion of the first pad (or pad 1) producing an E minor chord), the next chord player 125 in the front row is configured as an F minor chord player (with the center portion of the first pad (or pad 1) producing an F major chord), and the last chord player 125 in the front row is configured as a G major chord player (with the center portion of the first pad (or pad 1) producing a G major chord). As shown in FIG. 14, the sharp chords (i.e., $A^{\#}$, $C^{\#}$, $D^{\#}$, $F^{\#}$, and $G^{\#}$) are arranged in the back row of chord players 125. In accordance with aspects of the disclosure, when configured in the Alpha layout, the relative locations of the chords remain fixed so that a user can more easily move between the different chords regardless of the selected key. In such a manner, the chord board 100 provides a more accessible way of creating and enjoying music.

Figure 15:
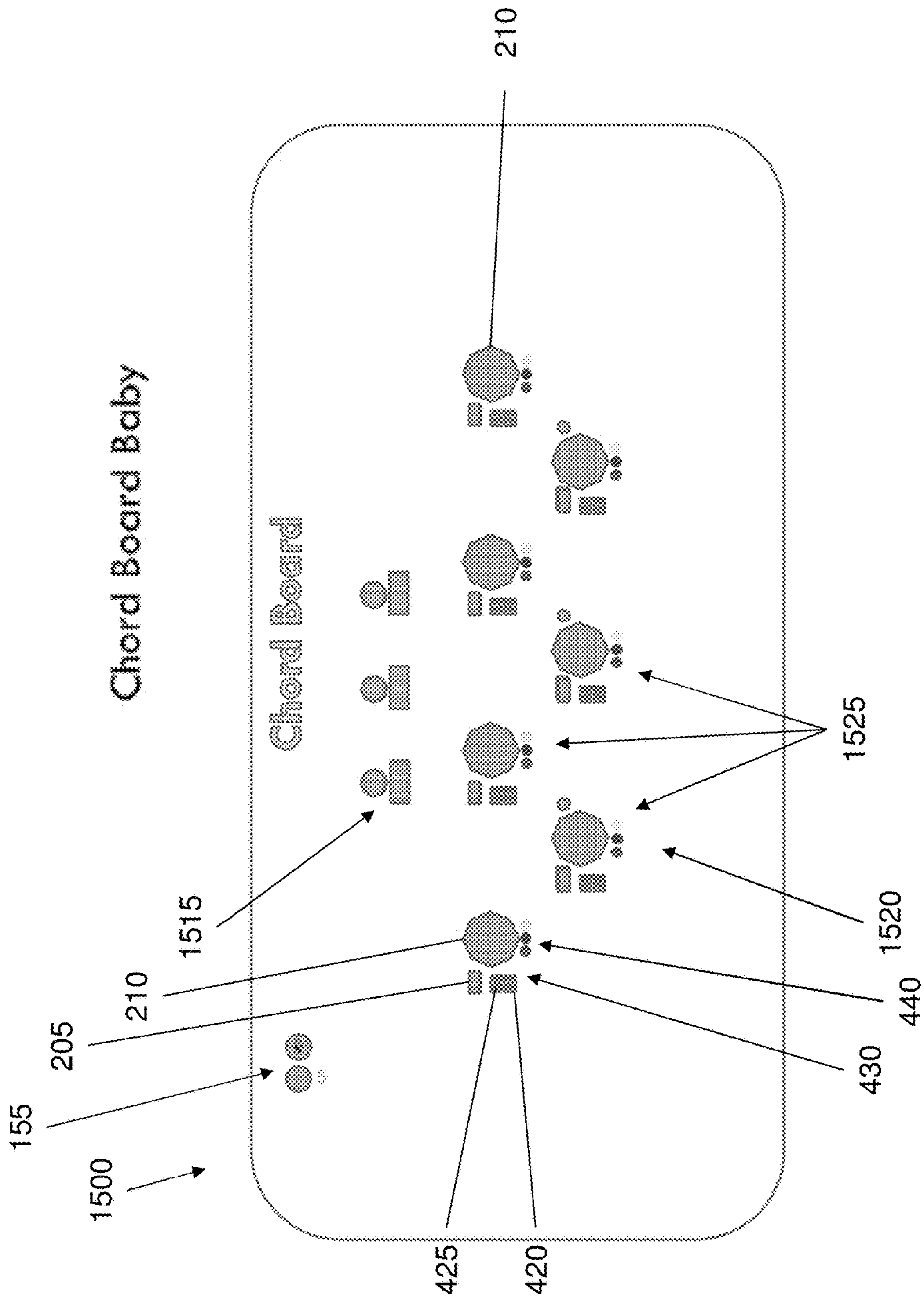
FIG. 15 shows an exemplary depiction of a chord board baby in accordance with aspects of the disclosure.

FIG. 15 shows an exemplary depiction of a chord board baby 1500 in accordance with aspects of the disclosure. As shown in FIG. 15, the chord board baby 1500 includes a power and volume (mute) control section 155 (including a power switch and a mute switch), and a setup control section 1515 (including selection controls for progression, key, and/or layout, for example). In embodiments, a lock function or control (e.g., switch) may allow a user to lock control of one or knobs of the setup control section 1515 to prevent inadvertent changes to selected settings.

In accordance with aspects of the disclosure, the chord board baby 1500 includes a chord player section 1520, which is operable to produce chords by a user depressing one pad with their finger. As shown in FIG. 15, with this exemplary embodiment of the disclosure, the chord player section 1520 includes less than twelve individual chord players 1525 (e.g., seven chord players), with each chord player 1525 corresponding to one of the twelve tones (e.g., A-A #/Bb-B-C-C #/Db-D-D #/Eb-E-F-F #/Gb-G-G #/Ab). As such, the chord player section 1520 includes seven chord players 1525. As described herein, the association between each of the seven tones (or root notes) and each of the chord players 1525 is configurable in different layouts (e.g., based upon a selected key or, a selected progression, and/or a desired layout). Each of the chord players 1525 includes a dedicated chord root note display 205, which is operable to display the root note corresponding to its respective chord player 1525.

As shown in FIG. 15, with this exemplary embodiment, the chord player 1525 includes a first pad (or pad 1) 210 (but not a second pad or a third pad), which provides a more simplified interface (e.g., for a baby, toddler, developmentally-disabled, musically-challenged, or elder to use). The chord player 1525 also includes an octave up button 425 and an octave down button 420 for selecting different octaves for the chord player 1525. By pressing the octave up button 425 or the octave down button 420, a user can quickly change the octave of the chord player 1525. With the exemplary embodiment, the currently selected octave may be displayed by illuminating one of a plurality of LEDS 430. In such a manner, a user can quickly move up and down to different octaves and easily determine which octave is currently selected. As shown in FIG. 15, each chord player 1525 also includes guidance indicators 440 for providing user guidance as to a next chord player to actuate (e.g., when playing a particular chord progression).

Figure 16:
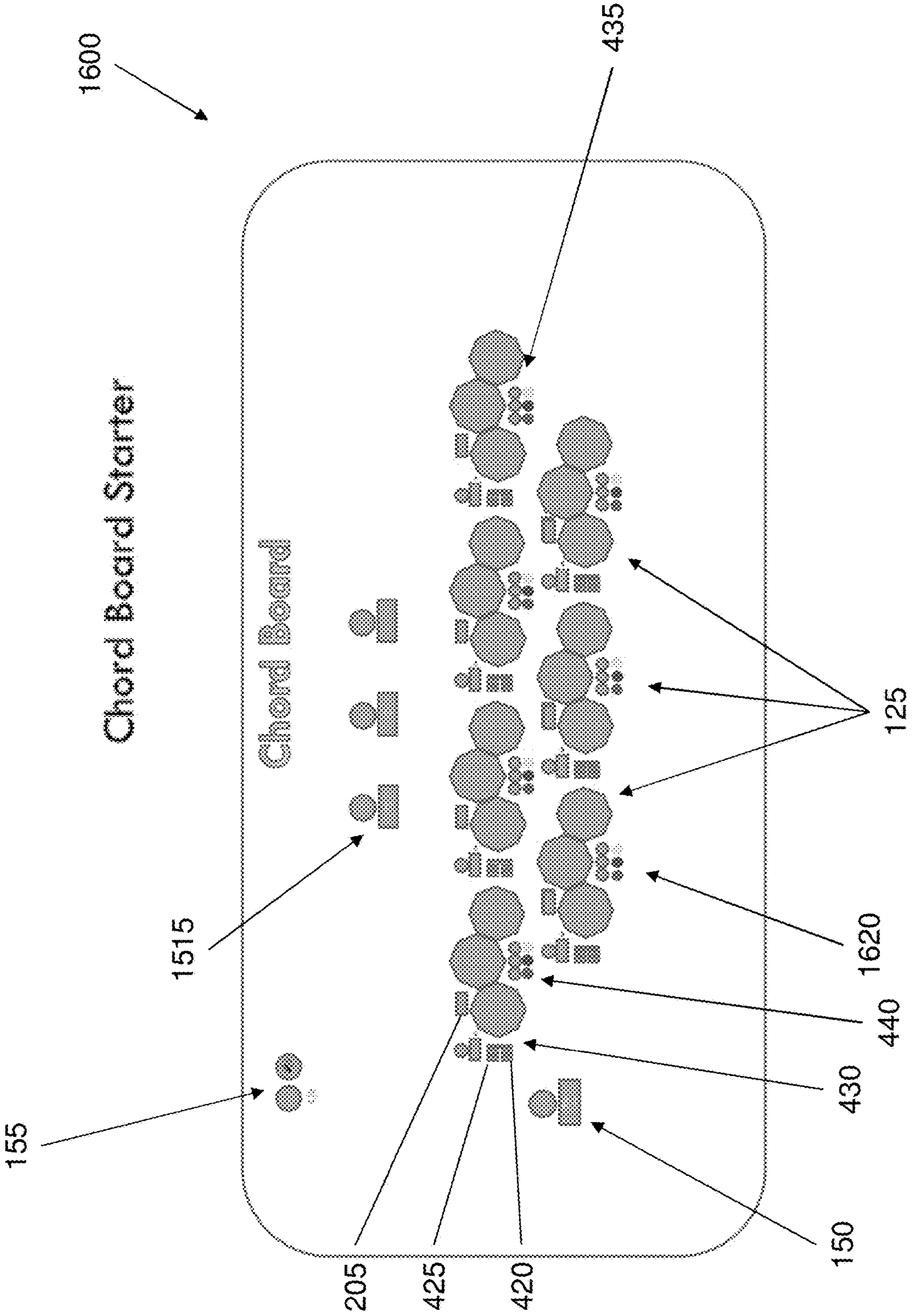
FIG. 16 shows an exemplary depiction of a chord board starter in accordance with aspects of the disclosure.

FIG. 16 shows an exemplary depiction of a chord board starter 1600 in accordance with aspects of the disclosure. As shown in FIG. 16, the chord board starter 1600 includes a power and volume (mute) control section 155 (including a power switch and a mute switch), and a setup control section

1515 (including selection controls for progression, key, and/or layout, for example). As shown in FIG. 16, with the chord board starter 1600, the chord player section 1620 includes less than twelve individual chord players 1525 (e.g., seven chord players), with each chord player 1525 corresponding to one of the twelve tones (e.g., A-A #/Bb-B-C-C #/Db-D-D #/Eb-E-F-F #/Gb-G-G #/Ab). As described herein, the association between each of the seven tones (or root notes) and each of the chord players 125 is configurable in different layouts (e.g., based upon a selected key, progression, and/or a desired layout). As shown in FIG. 16, the chord board starter 1600 includes a layout selector 150, which is operable to select a layout of the chord players 125 (i.e., select an association between each of the twelve tones (or chord root notes) and each of the chord players 125) and each chord player includes a root note display 205.

As shown in FIG. 16, each chord player 125 also includes an octave up button 425 and an octave down button 420 for selecting different octaves for the chord player 125. By pressing the octave up button 425 or the octave down button 420, a user can quickly change the octave of the chord player 125. With the exemplary embodiment, the currently selected octave may be displayed by illuminating one of a plurality of LEDS 430. In such a manner, a user can quickly move up and down to different octaves and easily determine which octave is currently selected. As shown in FIG. 16, each chord player 125 also includes guidance indicators 440 for providing user guidance as to a next chord player to actuate (e.g., when playing a particular chord progression) and memory buttons 435.

Figure 17:
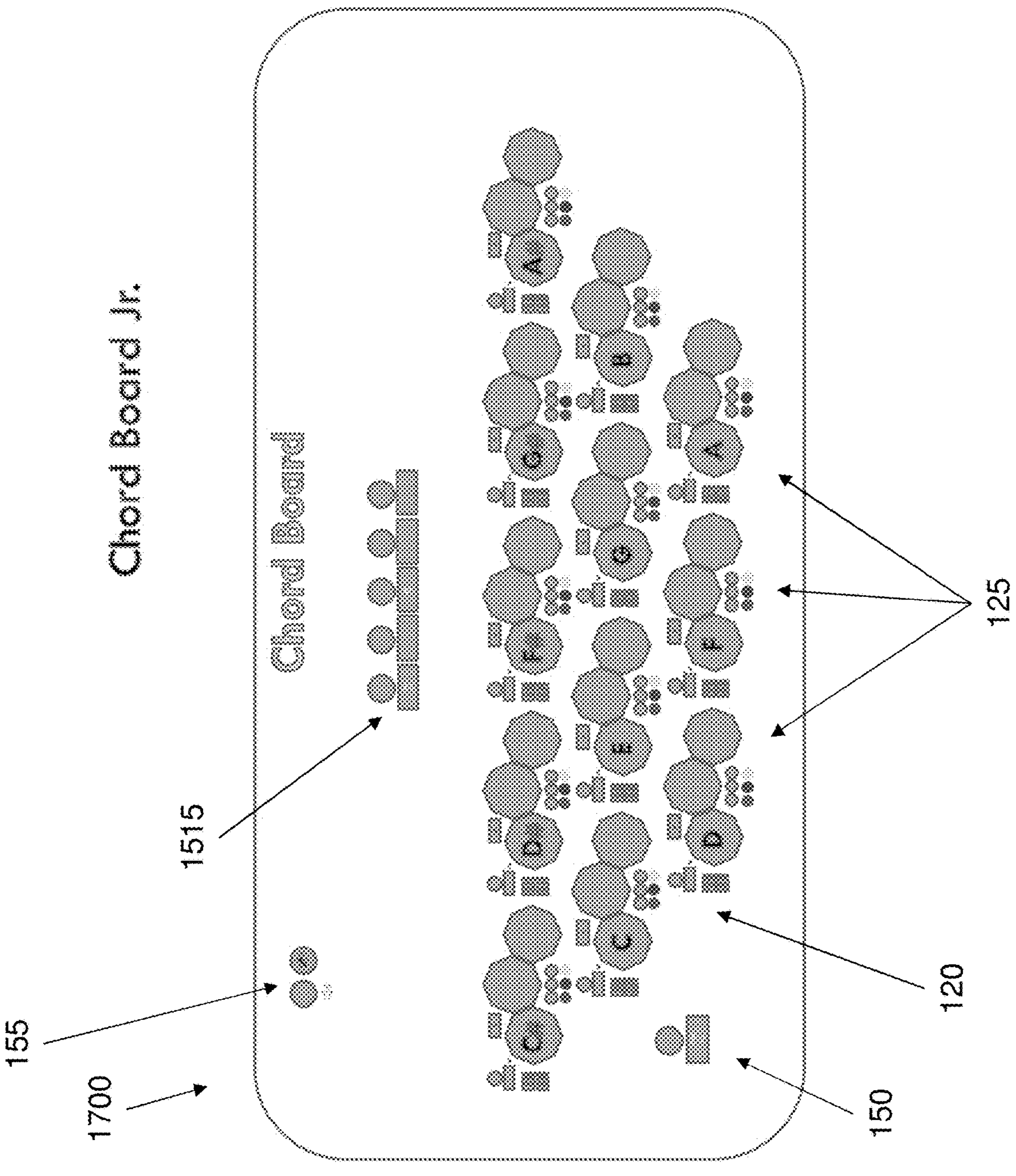
FIG. 17 shows an exemplary depiction of a chord board junior in accordance with aspects of the disclosure.

FIG. 17 shows an exemplary depiction of a chord board junior 1700 in accordance with aspects of the disclosure. As shown in FIG. 17, the chord board junior 1700 includes a power and volume (mute) control section 155 (including a power switch and a mute switch), and a setup control section 1515 (including selection controls for progression, key, and/or layout, for example). As shown in FIG. 17, with the chord board junior 1700, the chord player section 120 includes twelve individual chord players 125, with each chord player 125 corresponding to one of the twelve tones (A-A #/Bb-B-C-C #/Db-D-D #/Eb-E-F-F #/Gb-G-G #/Ab). As described herein, the association between each of the twelve tones (or root notes) and each of the chord players 125 is configurable in different layouts (e.g., based upon a selected key, progression, and/or a desired layout). As shown in FIG. 17, the chord board junior 1700 includes a layout selector 150, which is operable to select a layout of the chord players 125 (i.e., select an association between each of the twelve tones (or chord root notes) and each of the chord players 125).

Figure 18:
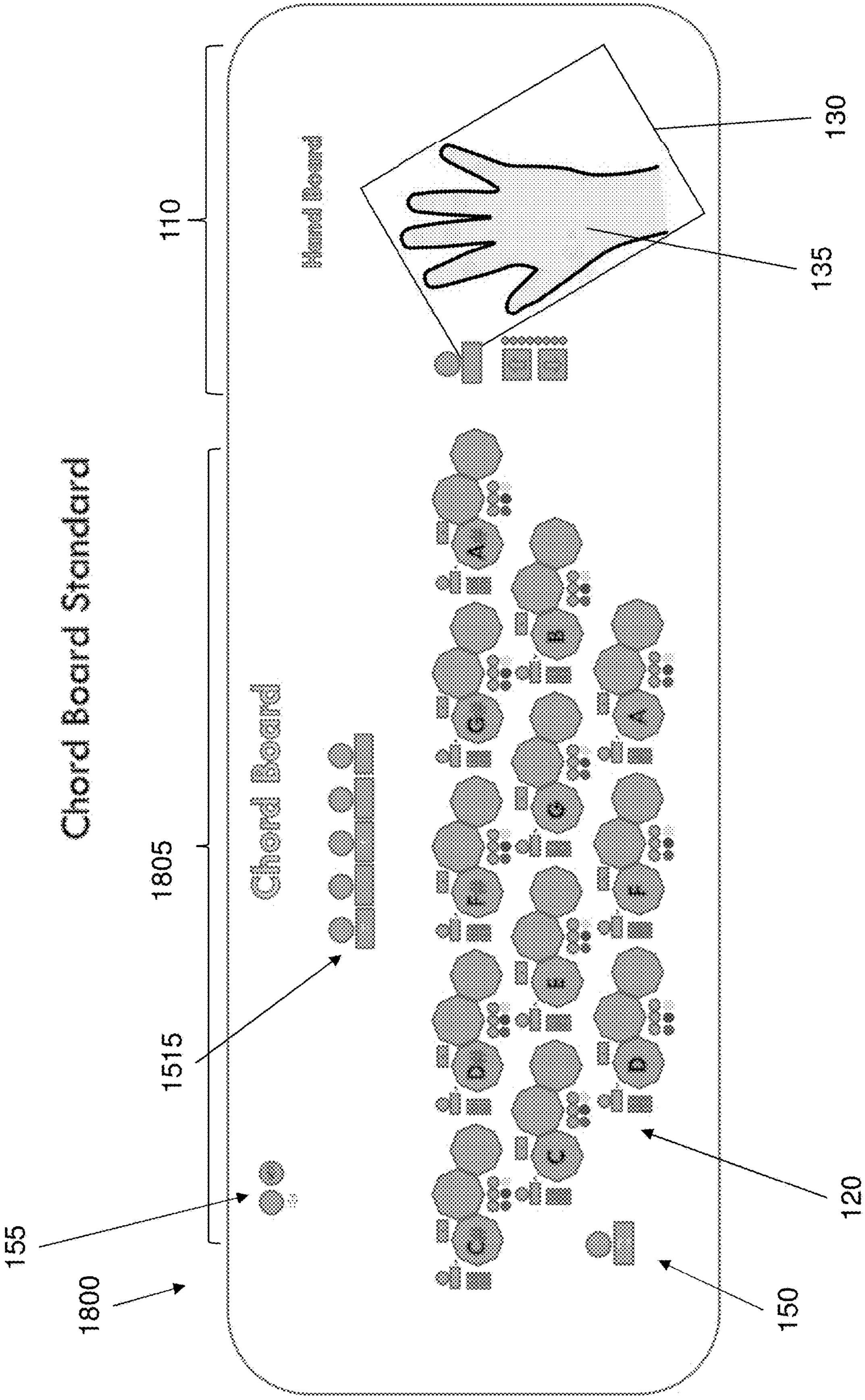
FIG. 18 shows an exemplary depiction of a chord board standard in accordance with aspects of the disclosure.

FIG. 18 shows an exemplary depiction of a chord board standard 1800 in accordance with aspects of the disclosure. As shown in FIG. 18, the chord board standard 1800 includes a chord side 1805 and a note side 110 (or "hand board") in accordance with aspects of the disclosure.

In accordance with aspects of the disclosure, the chord side 1805 includes a chord player section 120, which is operable to produce chords by a user depressing one or more pads with their left hand, and the note side 110 includes a note player 123 (or "Hand Board"), which is operable to produce one or more individual notes by a user depressing manipulating one or more fingers of their right hand 135 on a sensor pad 130.

As shown in FIG. 18, with a chord board standard 1800, the chord player section 120 includes twelve individual chord players 125, with each chord player 125 corresponding to one of the twelve tones (A-A #/Bb-B-C-C #/Db-D-D #/Eb-E-F-F #/Gb-G-G #/Ab). As shown in FIG. 18, the chord side 105 includes a layout selector 150, which is operable to select a layout of the chord players 125 (i.e., select an association between each of the twelve tones (or chord root notes) and each of the chord players 125.

As shown in FIG. 18, the chord board standard 1800 also includes a power and volume (mute) control section 155 (including a power switch and a mute switch), a setup control section 1515 (but no sequencer control section).

Figure 19:
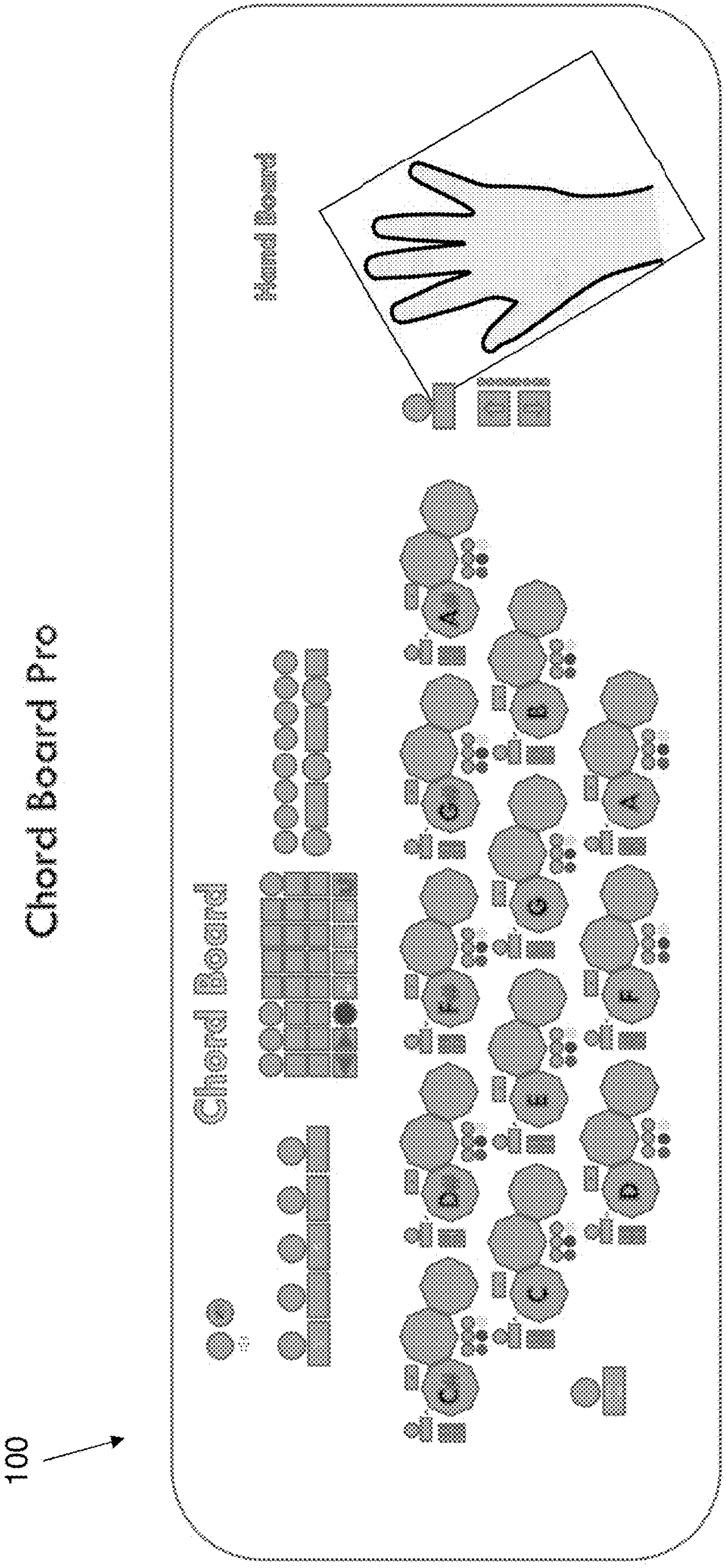
FIG. 19 shows an exemplary depiction of the chord board (or chord board pro) in accordance with aspects of the disclosure.

FIG. 19 shows an exemplary depiction of the chord board 100 (or chord board pro) in accordance with aspects of the disclosure. In comparing the embodiments of FIGS. 15-19, it should be appreciated that aspects of the disclosure can be alone and in combination to provide different benefits to a user.

Figure 20:
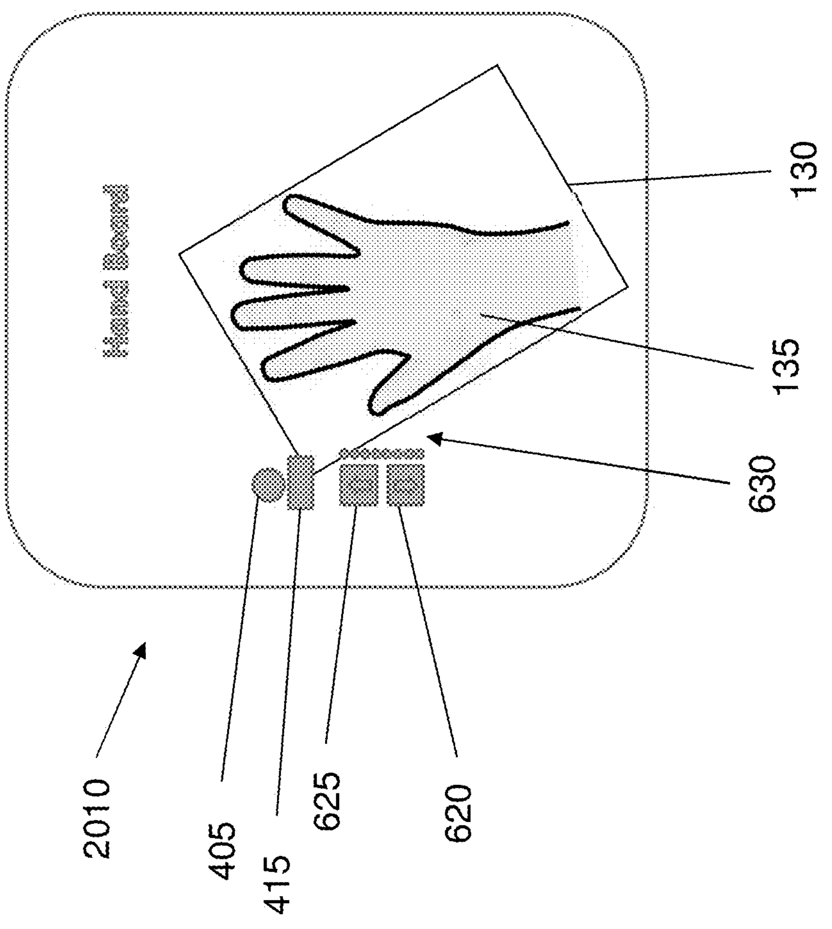
FIG. 20 shows an exemplary depiction of a stand-alone hand board note generator in accordance with aspects of the disclosure.

FIG. 20 shows an exemplary depiction of a stand-alone hand board 2010 note generator in accordance with aspects of the disclosure. The stand-alone hand board 2010 is operable to produce one or more individual notes by a user depressing and/or manipulating one or more fingers of their right hand 135 on a sensor pad 130. As shown in FIG. 20, the fingers of a user's hand 135 are used to actuate individual notes. The stand-alone hand board 2010 includes the sensor pad 130 which may be manipulated by a user's hand 135 (e.g., right hand).

Additionally, the stand-alone hand board 2010 (or note player) includes an octave up button 625 and an octave down button 620 for selecting different octaves for the hand board 2010 (or note player). By pressing the octave up button 625 or the octave down button 620, a user can quickly change the octave of the stand-alone hand board 2010. With the exemplary embodiment, the currently selected octave may be displayed by illuminating one of a plurality of LEDS 630. In such a manner, a user can quickly move up and down to different octaves and easily determine which octave is currently selected for the hand board 2010. The stand-alone hand board 2010 may also include an arpeggiator section having a rotary encoder 405 for selecting a particular arpeggiation pattern (e.g., from n patterns), a display 415 for indicating the selected arpeggiation pattern for the hand board 2010 (or note player). In some embodiments, the configuration of the stand-alone hand board 2010 may be user-configurable (e.g., via an associated app) to select a key for the hand board 2010. In other contemplated embodiments, the stand-alone hand board 2010 may have a key selector knob (e.g., a rotary controller). In other contemplated embodiments, the stand-alone hand board will receive chord and/or key information via MIDI and the finger sensors on sensor pad 130 will be configured to the pentatonic scale matching the chord and/or key.

System Environment

Aspects of embodiments of the present disclosure (e.g., a chord board) can be implemented by such special purpose hardware-based systems that perform the specified functions or acts, or combinations of special purpose hardware and computer instructions and/or software, as described above. The control systems may be implemented and executed from either a server, in a client server relationship, or they may run on a user workstation with operative information conveyed to the user workstation. In an embodiment, the software elements include firmware, resident software, microcode, etc. In contemplated embodiments, the control systems may be embedded in the chord board to make it stand alone. In contemplated embodiments, the chord board and control system may be virtually implemented on a touch screen.

As will be appreciated by one skilled in the art, aspects of the present disclosure may be embodied as a system, a method or a computer program product. Accordingly, aspects of embodiments of the present disclosure may take the form of an entirely hardware embodiment, an entirely software embodiment (including firmware, resident software, micro-code, touch screen, etc.) or an embodiment combining software and hardware aspects that may all generally be referred to herein as a "circuit," "module" or "system." Furthermore, aspects of the present disclosure (e.g., control systems) may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, touch screen, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, a magnetic storage device, a usb key, Bluetooth, and/or a mobile phone.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, entirely embedded within the chord board, or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider). Additionally, in embodiments, the present disclosure may be embodied in a field programmable gate array (FPGA).

Figure 21:
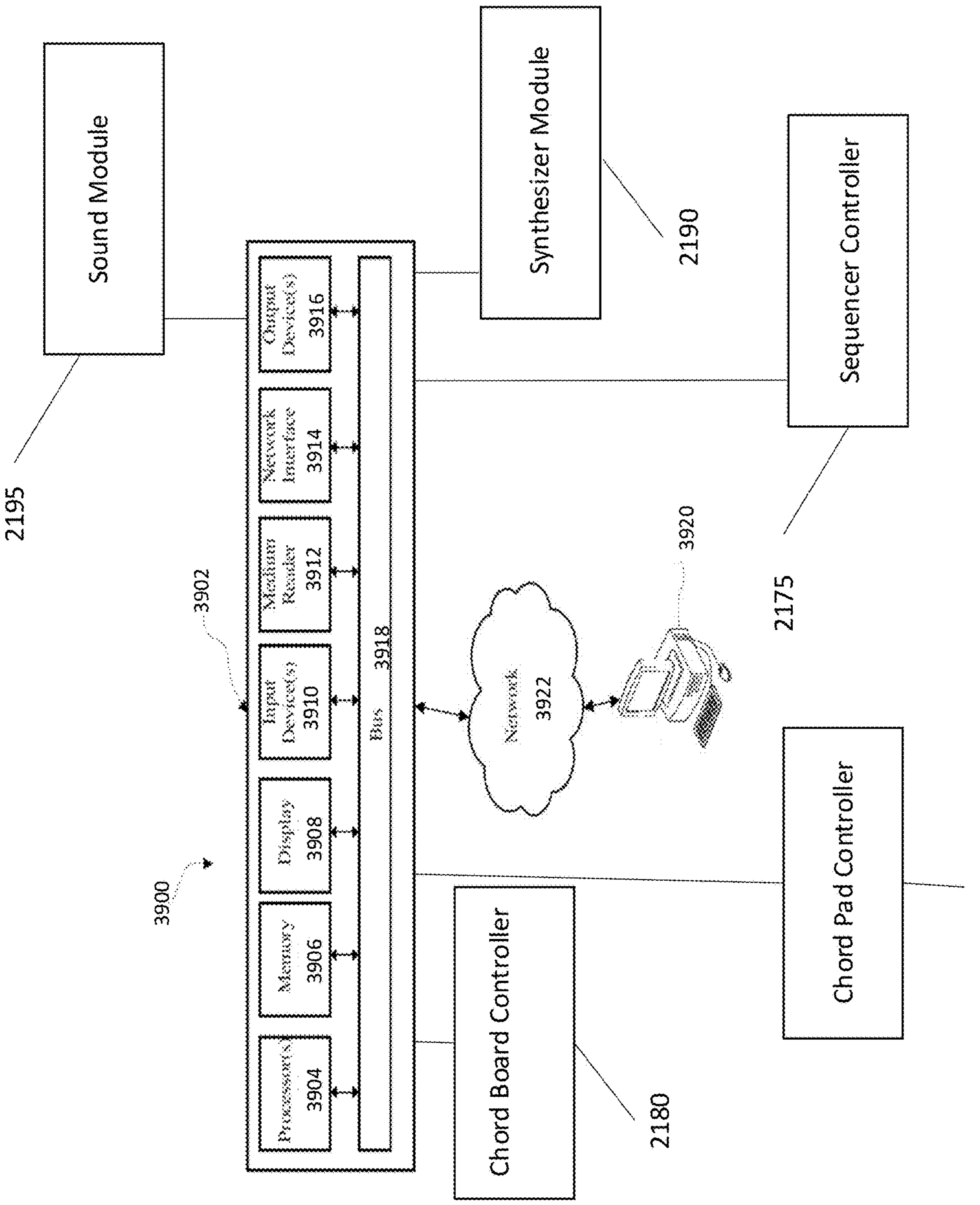
FIG. 21 shows an exemplary environment for practicing aspects of the present disclosure.

FIG. 21 is an exemplary system for use in accordance with the embodiments described herein. The system 3900 is generally shown and may include a computer system 3902, which is generally indicated. The computer system 3902 may operate as a standalone device or may be connected to other systems or peripheral devices. For example, the computer system 3902 may include, or be included within, any one or more computers, servers, systems, communication networks, cloud environment or embedded within the chord board.

The computer system 3902 may operate in the capacity of a server in a network environment, or in the capacity of a client user computer in the network environment. The computer system 3902, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that device. Further, while a single computer system 3902 is illustrated, additional embodiments may include any collection of systems or sub-systems that individually or jointly execute instructions or perform functions.

FIG. 21 shows an exemplary environment for practicing aspects of the present disclosure. As illustrated in FIG. 21, the computer system 3902 may include at least one processor 3904, such as, for example, a central processing unit, a graphics processing unit, or both. The computer system 3902 may also include a computer memory 3906. The computer memory 3906 may include a static memory, a dynamic memory, or both. The computer memory 3906 may additionally or alternatively include a hard disk, random access memory, a cache, or any combination thereof. Of course, those skilled in the art appreciate that the computer memory 3906 may comprise any combination of known memories or a single storage.

As shown in FIG. 21, the computer system 3902 may include a computer display 3908, such as a liquid crystal display, an organic light emitting diode, a flat panel display, a solid state display, a cathode ray tube, a plasma display, or any other known display. The computer system 3902 may include at least one computer input device 3910, such as a keyboard, a remote control device having a wireless keypad, a microphone coupled to a speech recognition engine, a camera such as a video camera or still camera, a cursor control device, or any combination thereof. Those skilled in the art appreciate that various embodiments of the computer system 3902 may include multiple input devices 3910. Moreover, those skilled in the art further appreciate that the above-listed, exemplary input devices 3910 are not meant to be exhaustive and that the computer system 3902 may include any additional, or alternative, input devices 3910.

The computer system 3902 may also include a medium reader 3912 and a network interface 3914. Furthermore, the computer system 3902 may include any additional devices, components, parts, peripherals, hardware, software or any combination thereof which are commonly known and understood as being included with or within a computer system, such as, but not limited to, an output device 3916. The output device 3916 may be, but is not limited to, a speaker, an audio out, a video out, a remote control output, or any combination thereof. As shown in FIG. 21, the system 3900 may include a chord board controller 2180 operable to control a virtual chord board (e.g., using a touch screen of a tablet) in accordance with the present disclosure, a hand board controller 2185 operable to control a virtual hand board (e.g., using a touch screen of a tablet) in accordance with the present disclosure, a sequencer controller 1275 operable to control a sequencer in accordance with the present disclosure, a synthesizer module 1290, and a sound module 1295.

Furthermore, the aspects of the disclosure may take the form of a computer program product accessible from a computer-usable or computer-readable medium providing program code for use by or in connection with a computer or any instruction execution system. The software and/or computer program product can be implemented in the environment of FIG. 21. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Although the present specification describes components and functions that may be implemented in particular embodiments with reference to particular standards and protocols (e.g., MIDI, pads), the disclosure is not limited to such standards and protocols. Such standards are periodically superseded by faster or more efficient equivalents having essentially the same functions. Accordingly, replacement standards and protocols having the same or similar functions are considered equivalents thereof.

While the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk, tapes or other storage device to capture carrier wave signals such as a signal communicated over a transmission medium. Accordingly, the disclosure is considered to include any computer-readable medium or other equivalents and successor media, in which data or instructions may be stored.

While the specification describes particular embodiments of the present disclosure, those of ordinary skill can devise variations of the present disclosure without departing from the inventive concept.

One or more embodiments of the disclosure may be referred to herein, individually and/or collectively, by the term "invention" merely for convenience and without intending to voluntarily limit the scope of this application to any particular disclosure or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

While the disclosure has been described with reference to specific embodiments, those skilled in the art will understand that various changes may be made and equivalents may be substituted for elements thereof without departing from the true spirit and scope of the disclosure. While exemplary embodiments are described above, it is not intended that these embodiments describe all possible forms of the embodiments of the disclosure. Rather, the words used in the specification are words of description rather than limitation, and it is understood that various changes may be made without departing from the spirit and scope of the disclosure. In addition, modifications may be made without departing from the essential teachings of the disclosure. Furthermore, the features of various implementing embodiments may be combined to form further embodiments of the disclosure.

What is claimed is:

1. A musical instrument, comprising a key selection receiver operable to receive a user selection of a selected key, and a note player operable to produce individual notes in the selected key, the note player having a plurality of note playing finger regions arranged on a playing surface in a splayed orientation in correspondence with fingers of a hand, wherein a layout of the individual notes playable by each of the finger regions of the note player corresponds to a selected chord, in which three finger regions of the note player correspond to a root note, a third note, and a fifth note of the selected chord in the selected key, wherein with a selected key, the note player is operable to provide appropriate notes to the finger positions for the selected key, such that, while accessing different notes, a user's fingers remain relatively positioned in respective finger positions on the note player, and wherein when the selected key changes, the appropriate notes change for each of the finger positions while the user's fingers remain relatively positioned in the respective finger positions on the note player.

2. The musical instrument of claim 1, wherein the layout of the note player corresponds to the selected chord of the selected key, and in which five finger regions of the note player correspond to five notes of a pentatonic scale corresponding to the selected key.

3. The musical instrument of claim 1, wherein the three finger regions include index finger, middle finger and ring finger regions of the note player, which respectively correspond to the root note, the third note, and the fifth note of the chord in the selected key.

4. The musical instrument of claim 1, wherein each finger region comprises a central region, at least one octave plus region and at least one octave minus region, wherein contacting the central region produces a selected note, contacting a first of the at least one octave plus regions will produce a note an octave higher than the selected note, and contacting a first of at least one octave minus regions produces a note an octave lower than the selected note.

5. The musical instrument of claim 4, wherein each finger region comprises at least one MIDI polyphonic expression (MPE) region.

6. The musical instrument of claim 5, wherein the MPE region is operable to detect pressure to control velocity and glide to control pitch bend and/or vibrato.

7. The musical instrument of claim 2, wherein the pentatonic scale is either a major pentatonic scale or a minor pentatonic scale, and the five finger regions include:

index finger, middle finger and ring finger regions of the note player operable to produce notes respectively corresponding to the root note, the third note, and the fifth note of the chord in the selected key, and a thumb region and a pinky region operable to produce a $4^{th}$ scale degree or $7^{th}$ scale degree from the major pentatonic or a $2^{nd}$ scale degree or $6^{th}$ scale degree from the minor pentatonic scale of the root note.

8. The musical instrument of claim 2, further comprising finger regions operable to produce:

remaining diatonic notes in the selected key but not in the pentatonic scale;

non-diatonic passing tones; and/or accidentals.

9. The musical instrument of claim 1, further comprising one or more hypothenar/thenar palm regions to detect a left-side palm contact and/or a right-side palm contact.

10. The musical instrument of claim 9, wherein the one or more hypothenar/thenar palm regions are operable to alter one or more parameters of the musical instrument or user configurable options of the musical instrument.

11. The musical instrument of claim 1, wherein the note player additionally comprises an arpeggiator.

12. The musical instrument of claim 11, wherein the arpeggiator is tied to each note press.

13. The musical instrument of claim 11, wherein the arpeggiator includes a selector for selecting a particular arpeggiation pattern.

14. The musical instrument of claim 11, wherein the arpeggiator includes a display for indicating a selected arpeggiation pattern for the note player.

15. The musical instrument of claim 11, wherein the arpeggiator includes a link button for linking together arpeggiators from one or more other instruments.

16. The musical instrument of claim 1, wherein the note player comprises a display operable to display a currently-selected chord for the note player.

17. The musical instrument of claim 1, wherein the note player additionally comprises an octave controller operable to selectively change an octave of a selected note.

18. The musical instrument of claim 17, wherein the octave controller comprises an octave up button and an octave down button for selecting different octaves for the note player.

19. The musical instrument of claim 17, wherein the octave controller comprises an octave display comprising a plurality of illuminable indicators, wherein each indicator indicates a particular octave, and an illuminated indicator of the plurality of illuminable indicators indicates a selected octave.

20. The musical instrument of claim 1, further comprising a chord player operable to produce chords in a selected key, wherein the chord player section is arranged on a first side of the musical instrument, and the note player is arranged on a second side of the musical instrument, and wherein a layout of the note player corresponds to a currently playing chord on the chord player, in which the three finger regions of the note player respectively correspond to a root note, a third note, and a fifth note of the currently playing chord.

21. The musical instrument of claim 1, wherein with a selected chord, the note player is operable to provide the appropriate notes to the finger positions for the selected chord and key, such that, while accessing different notes, the user's fingers remain relatively positioned in respective finger positions on the note player, and wherein when the selected chord changes, the appropriate notes change for each of the finger positions while the user's fingers remain relatively positioned in the respective finger positions on the note player.

22. A musical instrument, comprising a key selection receiver operable to receive a user selection of a selected key, and a note player operable to produce individual notes in the selected key, the note player having a plurality of note playing finger regions arranged on a playing surface in a splayed orientation in correspondence with fingers of a hand, wherein a layout of the individual notes playable by each of the finger regions of the note player corresponds to a selected chord, in which five finger regions of the note player correspond to five notes of a pentatonic scale corresponding to the selected key or the selected chord, and in which three inner finger regions of the note player correspond to a root note, a third note, and a fifth note of the selected chord in the selected key, wherein the note player includes a finger region for each finger, wherein the finger region comprises a central region, at least one octave plus region and at least one octave minus region, wherein contacting the central region produces the selected note, contacting a first of the at least one octave plus regions will produce a note an octave higher than the selected note, and contacting a first of at least one octave minus regions produces a note an octave lower than the selected note, wherein the five finger regions of the note player correspond to five notes of a major pentatonic scale or minor pentatonic scale corresponding to the selected key, wherein:

index finger, middle finger and ring finger regions of the note player are operable to produce notes respectively corresponding to the root note, the third note, and the fifth note of the chord in the selected key, a thumb region and a pinky region operable to produce a $4^{th}$ scale degree or $7^{th}$ scale degree from the major pentatonic or a $2^{nd}$ scale degree or $6^{th}$ scale degree from the minor pentatonic scale of the root note; and one or more hypothenar/thenar palm regions operable to alter one or more parameters of the musical instrument or user configurable options of the musical instrument, wherein with a selected key, the note player is operable to provide appropriate notes to the finger positions for the selected key, such that, while accessing different notes, a user's fingers remain relatively positioned in respective finger positions on the note player, and wherein when the selected key changes, the appropriate notes change for each of the finger positions while the user's fingers remain relatively positioned in the respective finger positions on the note player.

23. The musical instrument of claim 22, wherein each finger region includes at least one MIDI polyphonic expression (MPE) region.

* * * * *